(12) United States Patent
De

(10) Patent No.: US 10,649,969 B2
(45) Date of Patent: May 12, 2020

(54) MEMORY EFFICIENT PERSISTENT KEY-VALUE STORE FOR NON-VOLATILE MEMORIES

(71) Applicant: Western Digital Technologies, Inc., San Jose, CA (US)

(72) Inventor: Arup De, Milpitas, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 33 days.

(21) Appl. No.: 15/996,266

(22) Filed: Jun. 1, 2018

(65) Prior Publication Data

US 2018/0357234 A1 Dec. 13, 2018

Related U.S. Application Data

(60) Provisional application No. 62/519,094, filed on Jun. 13, 2017.

(51) Int. Cl.
*G06F 12/00* (2006.01)
*G06F 13/00* (2006.01)
*G06F 16/22* (2019.01)
*G06F 3/06* (2006.01)
*G06F 16/245* (2019.01)

(52) U.S. Cl.
CPC .......... *G06F 16/2255* (2019.01); *G06F 3/061* (2013.01); *G06F 3/0604* (2013.01); *G06F 3/064* (2013.01); *G06F 3/0644* (2013.01); *G06F 3/0679* (2013.01); *G06F 16/24569* (2019.01)

(58) Field of Classification Search
None
See application file for complete search history.

(56) References Cited

U.S. PATENT DOCUMENTS

| 8,818,971 | B1* | 8/2014 | Fontoura | G06F 16/23 707/696 |
| 2013/0151756 | A1* | 6/2013 | Tofano | G06F 3/0608 711/103 |
| 2014/0372374 | A1* | 12/2014 | Bourbonnais | G06F 16/273 707/613 |
| 2015/0160862 | A1* | 6/2015 | Blott | G06F 3/0604 711/148 |
| 2017/0068605 | A1* | 3/2017 | Goto | G06F 11/2094 |
| 2017/0123727 | A1* | 5/2017 | Kim | G06F 3/061 |

(Continued)

*Primary Examiner* — Sean D Rossiter
(74) *Attorney, Agent, or Firm* — Loza & Loza, LLP; Gabriel Fitch

(57) ABSTRACT

Aspects of the disclosure provide for memory efficient persistent key value store for a solid state device (SSD). The methods and apparatus provide a non-volatile memory (NVM) and a key value store (KVS) processor. The non-volatile memory (NVM) is configured to store a key value data structure. The KVS processor is configured to receive a key value store (KVS) command from a host. The KVS processor is also configured to perform a key value store (KVS) operation on the key value data structure based on the received KVS command. The performing of the key value store (KVS) operation may include using an index structure to process the key value data structure based on the received KVS command. The KVS processor is further configured to provide a response to the host based on the KVS operation.

22 Claims, 19 Drawing Sheets

(56) References Cited

U.S. PATENT DOCUMENTS

| | | | |
|---|---|---|---|
| 2018/0089074 A1* | 3/2018 | Li | G06F 12/0238 |
| 2018/0181604 A1* | 6/2018 | Marohn | G06F 16/273 |
| 2019/0034427 A1* | 1/2019 | Trika | G06F 16/2255 |
| 2019/0114366 A1* | 4/2019 | Gupta | G06F 16/986 |

* cited by examiner

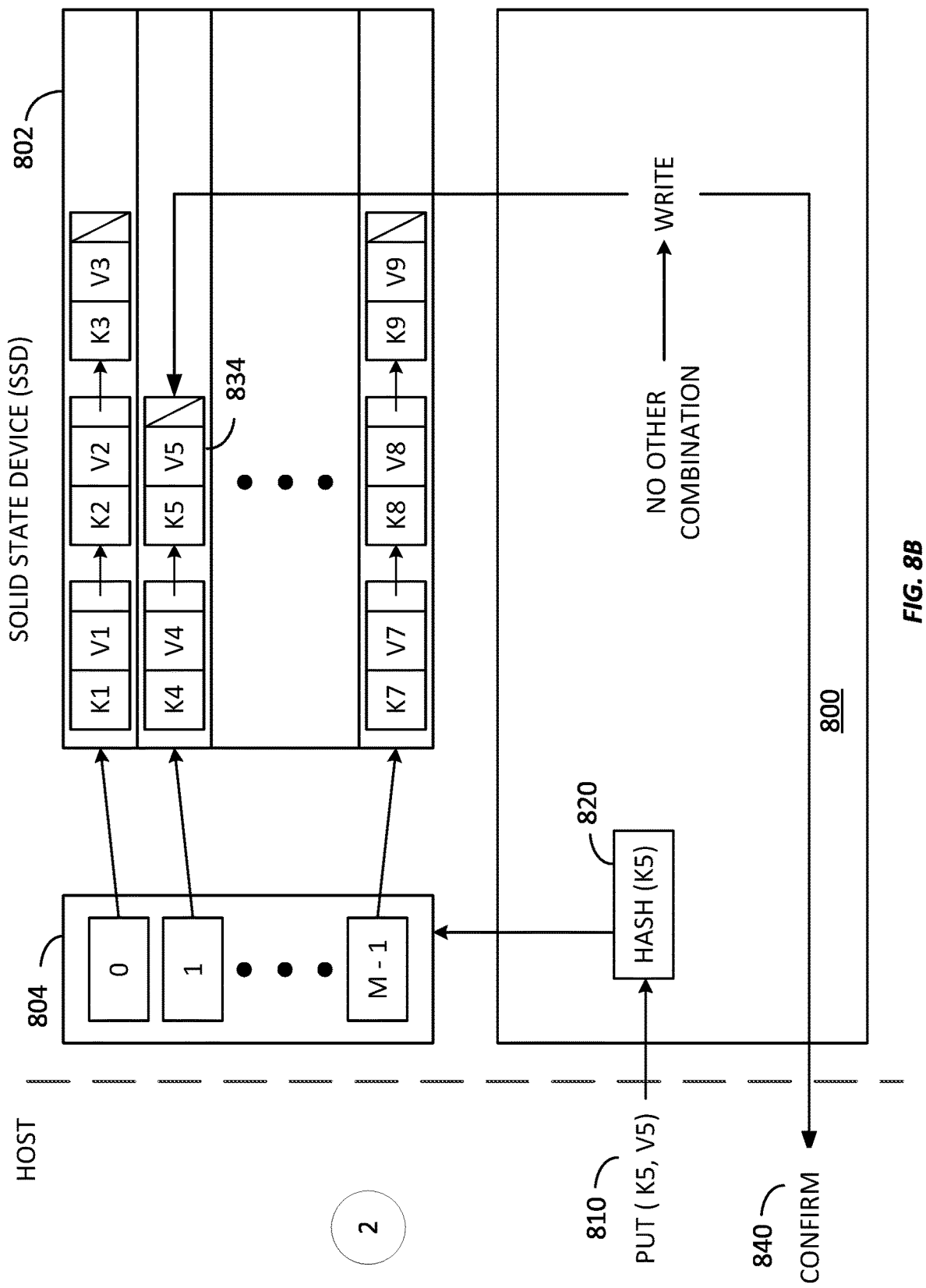

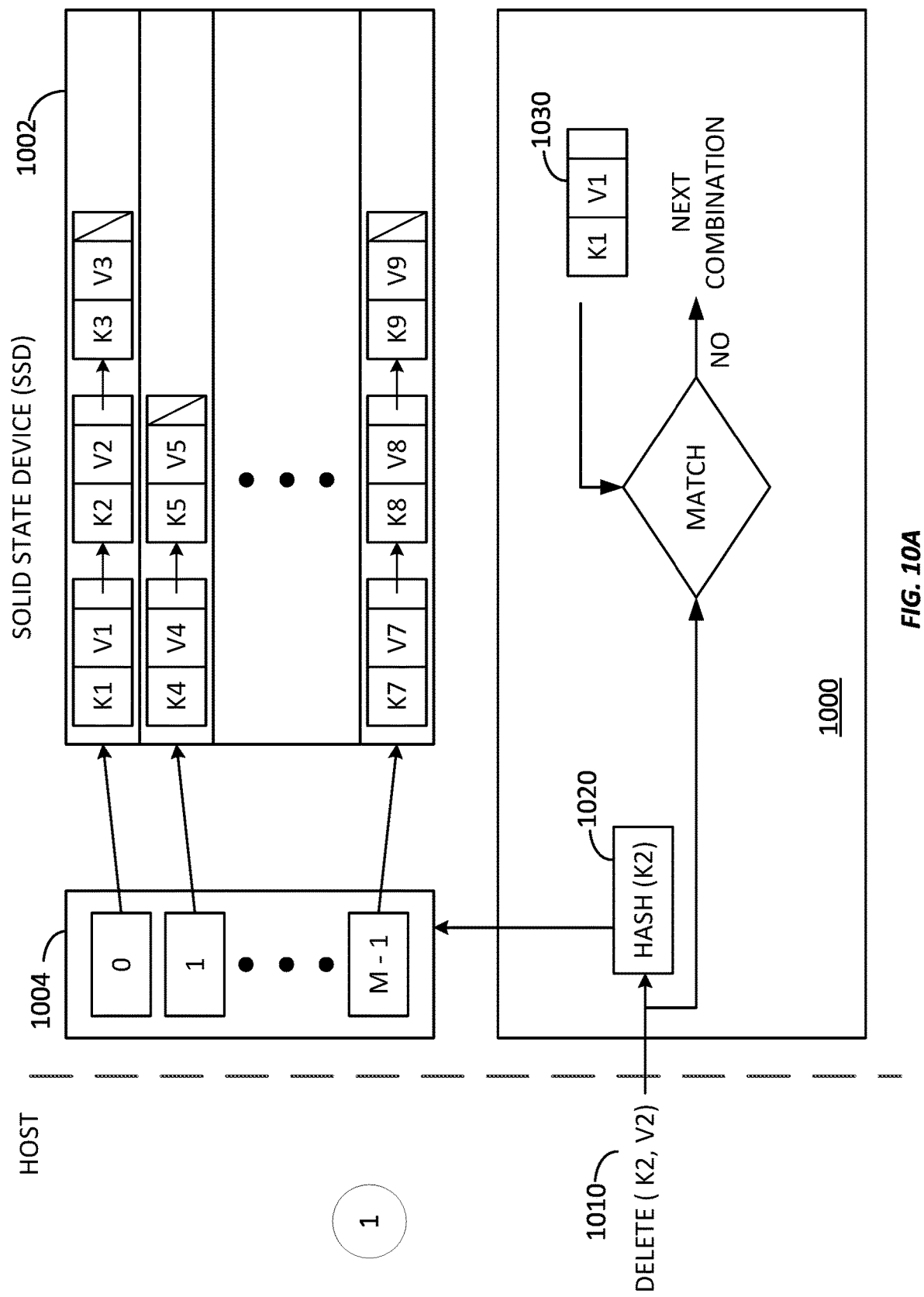

MEMORY EFFICIENT PERSISTENT KEY-VALUE STORE FOR NON-VOLATILE MEMORIES

CROSS-REFERENCE TO RELATED APPLICATION(S)

This application claims priority to and the benefit of U.S. Provisional Application No. 62/519,094, filed on Jun. 13, 2017, and entitled, "MEMORY EFFICIENT PERSISTENT KEY-VALUE STORE FOR NON-VOLATILE MEMORIES", the entire content of which is incorporated herein by reference.

FIELD

The present invention relates to non-volatile memories, and more particularly to memory efficient persistent key-value store for non-volatile memories.

INTRODUCTION

Key-value store (KVS) is commonly used in various large scale data-intensive database applications. Those database applications have random accesses over large datasets and have chosen the key-value store rather than a conventional relational database because of its high scalability and simplicity. Several research works have been done on flash-based KVSs to exploit the flash characteristics to improve performance and reduce the host main memory usage. Those KVS works keep key-value (KV) pairs in flash and an index structure (or a metadata per KV pair) in main memory (e.g., dynamic random access memory or DRAM) to support fast insertion, deletion and lookup operations. However, the performance of KVS is still limited by the large input/output (I/O) overhead (flash being approximately 100× slower than DRAM) and main memory size as the amount of digital data is doubling every two years and is approaching 44 zettabytes (44 trillion gigabytes) by 2020.

The main memory size imposes a challenging problem in scalability and performance due to relatively slow growth of DRAM capacity as compared to rapidly growing key-value (KV) datasets. More than 10 to 250 times slowdown due to increasing I/O overhead (in-storage linked list traversal due to hash table collisions) for different KV workloads has been observed.

Emerging fast byte-addressable non-volatile memory (eNVM) technologies such as ReRAM and 3D Xpoint are projected to offer two orders of magnitude higher performance than flash. However, the existing solid-state device (SSD) architecture optimizes for flash characteristics and is not adequate to exploit the full potential of eNVMs due to architectural and I/O interface (e.g., PCIe, SATA) limitations.

To improve the storage performance and reduce the host main memory requirement for KVS, an improved SSD architecture is proposed that provides better performance when processing large scale key value datasets.

SUMMARY

According to an aspect, a solid state device (SSD) that includes a non-volatile memory (NVM) and a key value store (KVS) processor is disclosed. The non-volatile memory (NVM) is configured to store a key value data structure. The KVS processor is configured to receive a key value store (KVS) command from a host. The KVS processor is also configured to perform a key value store (KVS) operation on the key value data structure based on the received KVS command. The performing of the key value store (KVS) operation may include using an index structure to process the key value data structure based on the received KVS command. The KVS processor is further configured to provide a response to the host based on the KVS operation.

According to another aspect, a method for operating a solid state device (SSD) is disclosed. The method stores, at a non-volatile memory (NVM) of the SSD, a key value data structure. The method receives a key value store (KVS) command from a host. The method identifies, at the SSD, an entry of an index structure based on the received KVS command. The method identifies a group of key value data from the key value data structure based on the identified entry. The method processes, at the SSD, one or more key value data from the identified group of key value data based on the received KVS command. The method provides a response to the host, based on the processing of the one or more key value data.

According to another aspect, an apparatus for operating a solid state device (SSD) is disclosed. The apparatus comprising means for non-volatile storing of a key value data structure and means for key value store (KVS) processing. The means for key value store (KVS) processing comprising means for receiving a key value store (KVS) command from a host, means for performing a key value store (KVS) operation on the key value data structure based on the received KVS command, and means for providing a response to the host based on the KVS operation. The means for performing the key value store (KVS) operation comprises generating a hash value based on the received KVS command.

DETAILED DESCRIPTION

The present disclosure provides a solid state device (SSD) that includes a non-volatile memory (NVM) and a key value store (KVS) processor. The non-volatile memory (NVM) is configured to store a key value data structure. The KVS processor is configured to receive a key value store (KVS) command from a host. Examples of key value store (KVS) commands include a get command, a put command, and a delete command. The KVS processor is also configured to perform a key value store (KVS) operation on the key value data structure based on the received KVS command. The performing of the key value store (KVS) operation may include using an index structure to process the key value data structure based on the received KVS command. The KVS processor is further configured to provide a response to the host based on the KVS operation.

Other approaches to KVS processing mainly use caching and efficient indexing schemes to improve performance and reduce the I/O overhead, whereas the disclosed solid state device (SSD) can keep both key-value data and the index structure in the SSD, thus reducing the amount of key value data that is transmitted to a host. In addition, the disclosed methods can offload key-value store operations to the SSD to exploit the low latency, high internal bandwidth of NVMs and parallelism across multiple controllers. The disclosed SSD may implement indexing capability within the SSD and has an in-storage processing engine (e.g., KVS processor) that implements key-value operations such as get, put and delete to efficiently operate on key value (KV) datasets.

Figure 1:
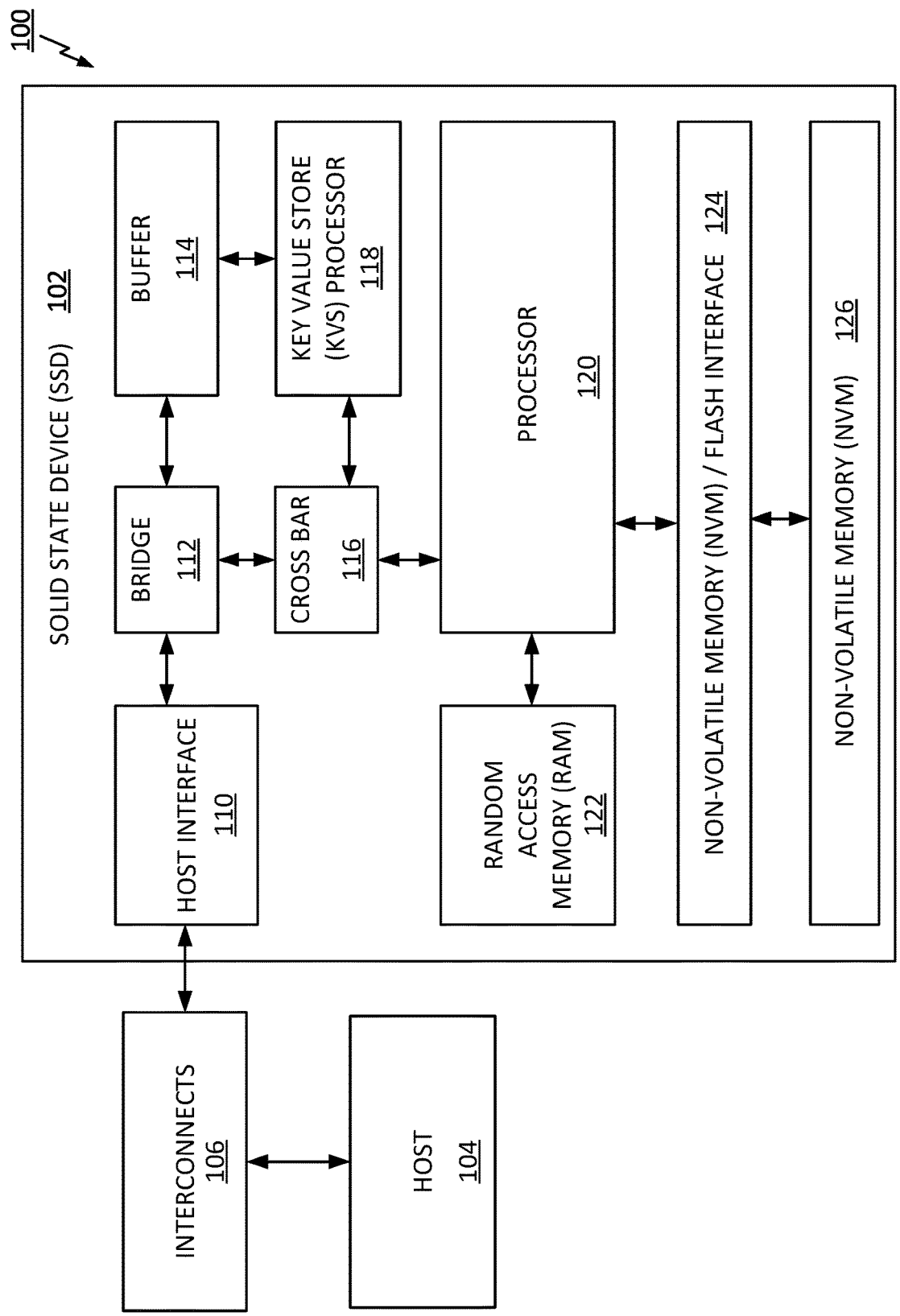
FIG. 1 illustrates a block diagram of a solid state device (SSD) that includes a key value store (KVS) processor in accordance with embodiments of the present disclosure.

FIG. 1 illustrates a block diagram of a system 100 that includes a solid state device (SSD) with key value store (KVS) processing functionality. The system 100 includes a solid state device (SSD) 102 and a host 104. The SSD 102 is a storage device (e.g., SSD storage device). The SSD 102 is coupled to the host 104 through one or more interconnects 106. The one or more interconnects 106 provide physical input/output (I/O) data connections between the SSD 102 and the host 104. Data that travels between the SSD 102 and the host 104 may be referred as I/O overhead. Data can include instructions, commands and/or responses.

The host 104 may be any system and/or device having a need for data storage or retrieval and a compatible interface for communicating with the SSD 102. For example, the host 104 may be a computing device, a personal computer, a portable computer, a workstation, a server, a router, a network device, a personal digital assistant, a digital camera, a digital phone, or combinations thereof. The host 104 can include several hosts. The host 104 may be a separate (e.g., physically separate) device from the SSD 102. In some embodiments, the host 104 includes the SSD 102. In other embodiments, the SSD 102 is remote with respect to the host 104 or is contained in a remote computing system communicatively coupled with the host 104. For example, the host 104 may communicate with the SSD 102 through a wireless communication link.

The host 104 provides commands to the SSD 102 for transferring data between the host 104 and the SSD 102. For example, the host 104 may provide a write command to the SSD 102 for writing data to the SSD 102, or a read command to the SSD 102 for reading data from the SSD 102. The SSD 102 may provide a response, to the write command or the read command, to the host 104 through the one or more interconnects 106. As will be further described below, the SSD 102 is able to process different types of commands, including key value store (KVS) commands and non-key value store (KVS) commands from the host 104. KVS commands and non-KVS commands are further described below.

The SSD storage device 102 includes a host interface 110, a bridge 112, a buffer 114, a cross bar 116, a key value store (KVS) processor 118, a processor 120 (or alternatively, an NVM processor 120), a random access memory (RAM) 122, a non-volatile memory (NVM) interface 124 (which may also be referred to as a Flash memory interface), and a non-volatile memory (NVM) 126, such as a NAND Flash memory.

The host interface 110 is coupled to the processor 120 via the bridge 112 and the cross bar 116. It is noted that the host interface 110 may be coupled to the processor 120 differently. For example, the host interface 110 may be coupled to the processor 120 directly. In another example, the host interface 110 may be coupled to the processor 120 via the bridge 112 without the need to be coupled to the cross bar 116. The host interface 110 facilitates communication between the host 104 and other components of the SSD 102, such as the processor 120 and/or the KVS processor 118. The host interface 110 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like.

The bridge 112 is coupled to the key value store (KVS) processor 118 via the buffer 114. In some implementations, the bridge 112 may be part of the host interface 110. The buffer 114 helps manage the flow of data between the KVS processor 118 and the bridge 112. The KVS processor 118 is coupled to the processor 120 via the cross bar 116. The KVS processor 118 may represent one or more KVS processors. In some implementations, the KVS processor 118 is coupled to the processor 120 without going through the cross bar 116. The cross bar 116 helps manage the flow of data that travels between the KVS processor 118 and the processor 120, and the flow of data between the bridge 112 and the processor 120. The various components of the SSD 102 may communicate with each other through the use of a communication protocol (e.g., Advance eXtensible Interface (AXI) protocol). In some implementations, the cross bar 116 may be part of the bridge 112.

The bridge 112 is configured to determine whether commands from the host 104 (via the host interface 110) are KVS commands or non-KVS commands. When the commands are non-KVS commands, the bridge 112 may direct or send the commands to the processor 120 via the cross bar 116. When the commands are KVS commands, the bridge 112 directs or sends the commands to the KVS processor 118. The KVS commands are processed by the KVS processor 118, and the processed KVS commands are then directed or sent to the processor 120. Examples of KVS commands include a get command, a put command, and a delete command. Examples of the processing of KVS commands are further described below in at least FIGS. 2, 5, 7A-7C, 8A-8B, 9A-9C, and 10A-10C. Thus, one functionality that the SSD 102 provides is the ability to process different types of commands. This enables the SSD 102 to operate and work with a wider range of devices, systems, hosts and/or applications than other SSDs. In addition, the ability to process key value data at the SSD reduces the I/O overhead between the host and the SSD, thus speeding up the overall performance of the SSD.

The processor 120 is coupled to the RAM memory 122 as well as the NVM 126 via the NVM interface 124. The processor 120 controls operation of the SSD 102. In various aspects, the processor 120 receives commands from the host 104 through the host interface 110 and performs the commands (e.g., KVS commands, non-KVS commands) to transfer data between the host 104 and the NVM 126. As mentioned above, when the command is a KVS command, the processor 120 may receive commands through the KVS processor 118. Furthermore, the processor 120 may manage reading from and writing to memory 122 for performing the various functions effected by the processor 120 and to maintain and manage cached information stored in memory 122.

The processor 120 and/or the KVS processor 118 may include any type of processing device, such as a microprocessor, a microcontroller, an embedded controller, a logic circuit, software, firmware, or the like, for controlling operation of the SSD 102. In some aspects, some or all of the functions described herein as being performed by the processor 120 may instead be performed by another component of the SSD 102. For example, the SSD 102 may include a microprocessor, a microcontroller, an embedded controller, a logic circuit, software, firmware, or any kind of processing device, for performing one or more of the functions described herein as being performed by the processor 120. In some implementations, the KVS processor 118 may be part of the processor 120. According to other aspects, one or more of the functions described herein as being performed by the processor 120 are instead performed by the host 104. In still further aspects, some or all of the functions described herein as being performed by the processor 120 may instead be performed by another component such as a processor in a hybrid drive including both non-volatile memory elements and magnetic storage elements.

The memory 122 may be any memory, computing device, or system capable of storing data. For example, the memory 122 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the processor 120 uses the memory 122, or a portion thereof, to store data during the transfer of data between the host 104 and the NVM 126. For example, the memory 122 or a portion of the memory 122 may be a cache memory.

The NVM 126 receives data from the processor 120 via the NVM interface 124 and stores the data. The NVM 126 may be any type of non-volatile memory, such as a flash storage system, a NAND-type flash memory, a solid state device (SSD), a flash memory card, a secure digital (SD) card, a universal serial bus (USB) memory device, a CompactFlash card, a SmartMedia device, a flash storage array, or the like.

Key Value Store (KVS) Processor

As mentioned above, the SSD 102 includes a key value store (KVS) processor 118 that enables the SSD 102 to process KVS commands on key value KV databases. KV databases arrange data as a single opaque collection. This allows more flexibility in what kind of data that can be stored. In addition, for the same number of data sets, a KV database uses less memory than other database structures, such a relational databases (RBD). KVS commands are used to access KV databases. KVS commands are commands that are specific to KV databases. These KVS commands perform very specific functions with respect to a KV database. Outside of the KV database, these KVS commands do not work. Examples of KVS commands are get commands, put commands, and delete commands.

Figure 2:
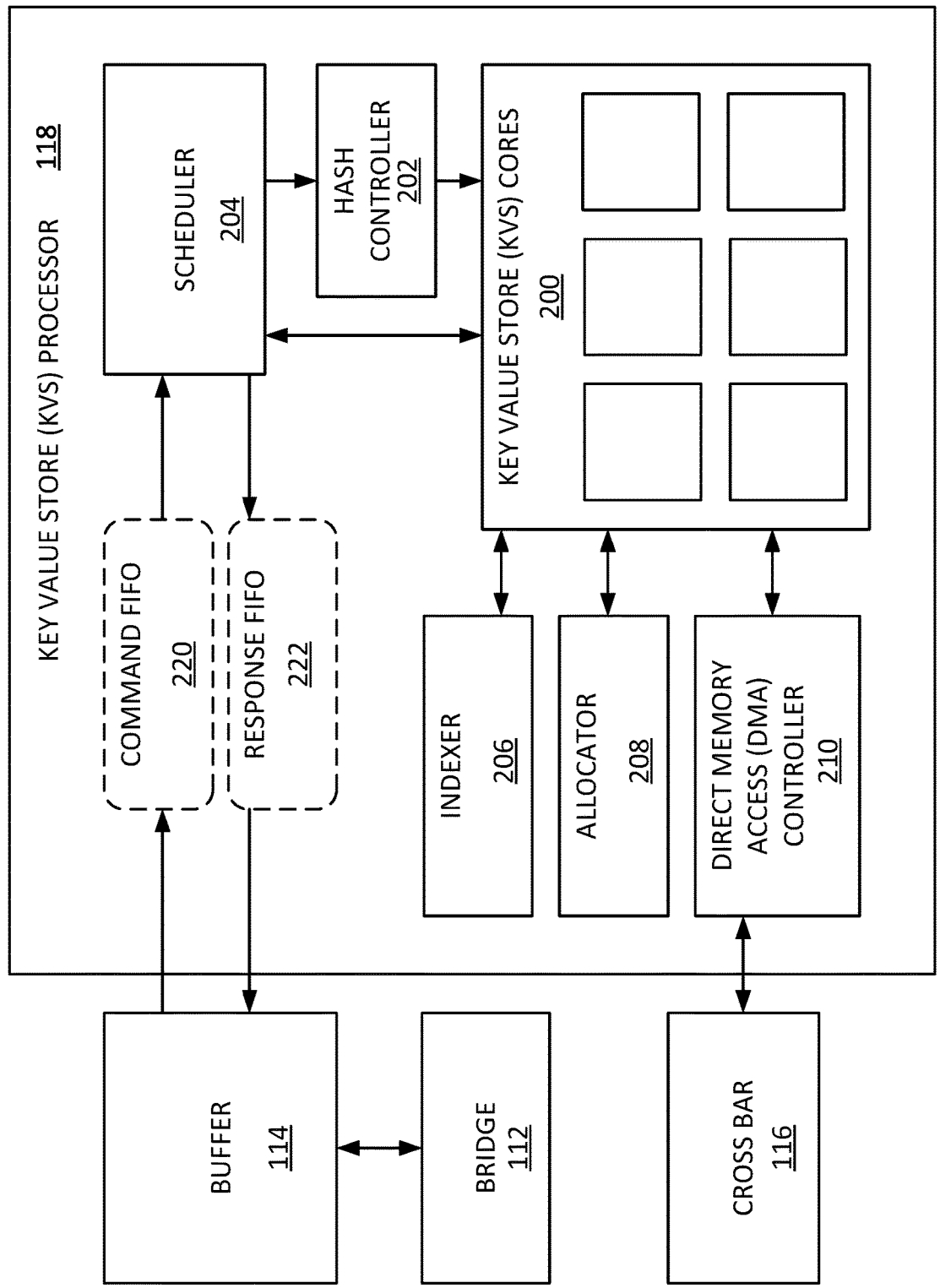
FIG. 2 illustrates a block diagram of a key value store (KVS) processor in accordance with embodiments of the present disclosure.

FIG. 2 illustrates a block diagram of the KVS processor 118. The KVS processor 118 may represent one or more KVS processors. The KVS processor 118 is configured to perform a key value store (KVS) operation on a key value data structure based on a KVS command. A key value store (KVS) operation may include a hashing operation, which is further described below in at least FIGS. 7A-7C and 12.

The KVS processor 118 includes one or more key value store (KVS) cores 200, a hash controller 202, a scheduler 204, an indexer 206, an allocator 208, and a Direct Memory Access (DMA) controller 210. The KVS cores 200 coupled to the hash controller 202, the scheduler 204, the indexer 206, the allocator 208, and the DMA controller 210. The DMA controller 210 is coupled to the cross bar 116. The hash controller 202 is coupled to the scheduler 204.

The scheduler 204 manages commands from the host 104 (via the host interface 110, the bridge 112, the buffer 1140) and responses to the host 104. The scheduler 204 may receive commands 220 from the buffer 114 and schedule them under first in first out (FIFO). Similarly, the scheduler 204 may send responses 222 to the buffer 114 under first in first out (FIFO). In some implementations, the scheduler 204 may apply round robin scheduling to the various commands. The scheduler 204 may direct commands to various cores of the KVS cores 200. This allows the KVS processor 118 to process several commands in parallel to each other. The scheduler 204 may also schedule commands to be processed sequentially by the same core in instances of hash collision in KV datasets. As the KV datasets increase, hash collisions increase Hash collision is further described below in at least FIGS. 7A-7C.

The hash controller 202 performs hash computations on KVS commands. A hash computation may include computing a hash value based on a key that is associated with a command received from a host. In some implementations, a hash computation may include using a hash function to map data (e.g., key) of arbitrary size to data (e.g., hash value) of fixed size. The hash function may be used to map a key to a key value data structure, where the key can be used with an index structure to point to a group (e.g., bucket) in the key value data structure that stores one or more key and value combinations. The number of possible keys is typically larger than the number of entries (e.g., hash values) in the index structure. Each entry (e.g., hash value) in the index structure will point to a specific location (e.g., group, bucket, a particular key value combination of the group) in the key value data structure. The specific location may be a particular location of a key value combination of the group. A hash function may generate the same hash value for different keys, which is known as a hash collision. Thus, different keys may be part of the same group (e.g., bucket) in the key value data structure. A specific location (e.g., group, bucket) in the key value data structure may store more than one key and value combination (e.g., one or more stored key and stored value combinations). A particular location of the key value data structure may include one or several physical addresses. In some implementations, a particular location of the key value data structure may refer to one location of the key value data structure or several locations of the key value data structure. Hashing is described in further detail below in at least FIGS. 7A-7C.

The indexer 206 is configured to perform lookup for an index structure and provides a physical address location of a particular group (e.g., bucket) for the key value data structure. The indexer 206 also performs update of new physical addresses for an index structure. The indexer 206 may also use a bitmap structure to provide a valid pointer check.

The allocator 208 is configured to manage available and used blocks (e.g., storage blocks, memory blocks) inside the SSD 102. The allocator 208 may allocate and/or deallocate memory blocks inside the SSD 102. The allocator 208 may use a bitmap structure to manage the memory blocks. The DMA controller 210 is configured to load and/or store data from the NVM to local memory, via the cross bar 116. The KVS cores 200 is configured to perform different KVS commands, such as a get command, a put command, and a delete command. The KVS cores 200 may receive the index structure from the hash controller 202. The KVS cores 200 may communicate with the indexer 206 to get physical address pointers. The KVS cores 200 may communicate with the DMA controller 210 to load data to local memory. The KVS cores 200 may communicate with the allocator 208 to perform allocation and/or deallocation of blocks.

Device Architecture

Figure 3:
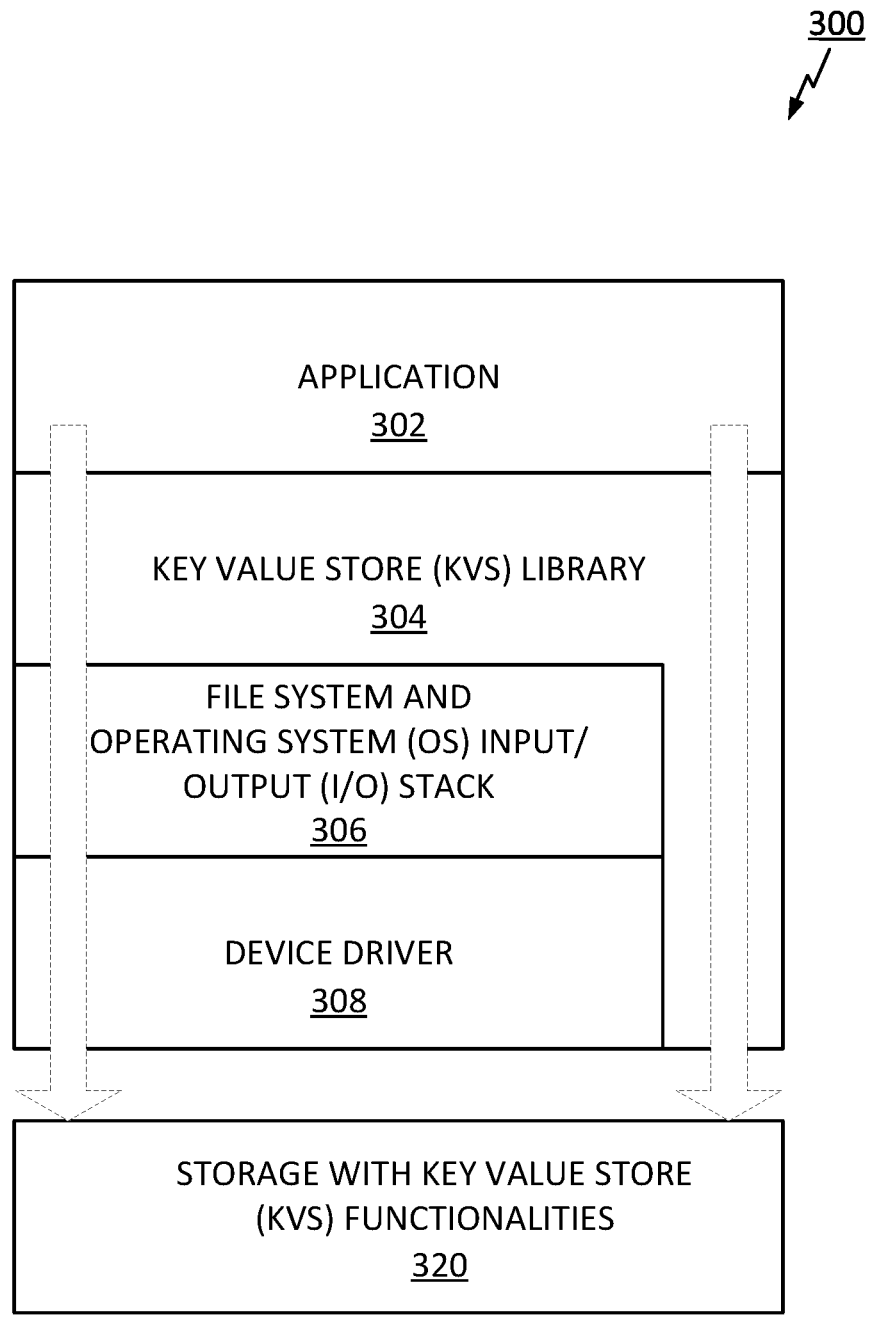
FIG. 3 illustrates a diagram of a device architecture between a host and a solid state device (SSD) in accordance with embodiments of the present disclosure.
Figure 4:
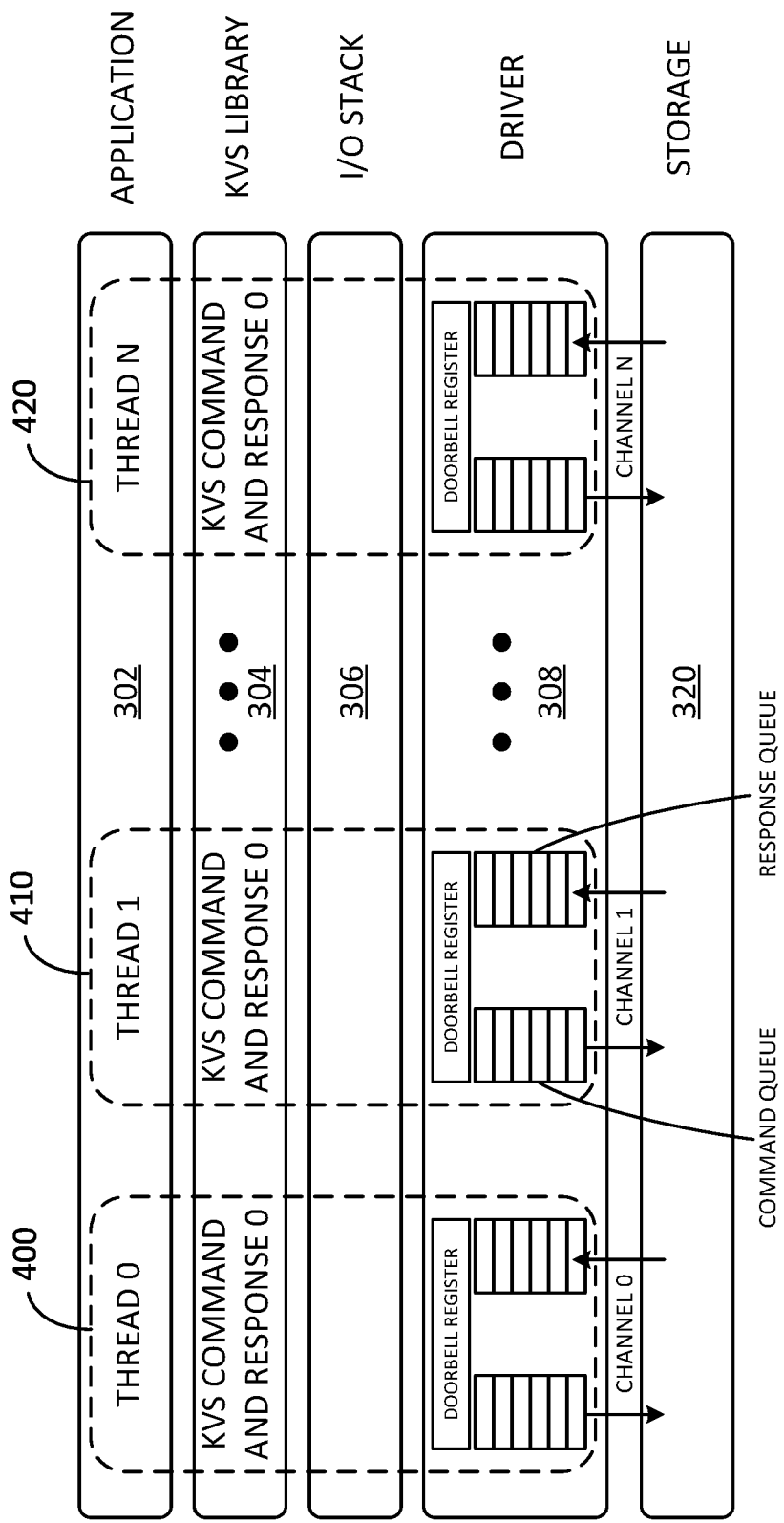
FIG. 4 illustrates a diagram of a device architecture with several threads, between a host and a solid state device (SSD) in accordance with embodiments of the present disclosure.

FIGS. 3 and 4 illustrate how data may be packaged and processed on the device side (e.g., host device) when the device (e.g., host) is coupled to an SSD that includes KVS functionality. In a conventional system host, each access to the storage data via system software I/O stack incurs significant operating system and file system overhead. The device architecture(s) described in FIGS. 3 and 4 enhance the existing software stack by providing direct access to the key-value store data to improve the overall performance. FIG. 3 illustrates a diagram of an exemplary device architecture between a host and a solid state device (SSD) that includes KVS functionality. The device architecture 300 includes an application layer 302, a key value store (KVS) library layer 304, an input/output (I/O) stack layer 306 (e.g., file system and operating system I/O stack), and a device driver layer 308. The device architecture 300 allows a device (e.g., host) to communicate with a solid state device (SSD) 320 that includes KVS functionality.

The application layer 302 specifies application specific commands and data (e.g., web browser commands, website data). The KVS library layer 304 includes a command about getting, updating, putting, and/or deleting data that is stored in a key value data structure. Commands for the KVS library layer 304 includes a get command, a put command, and a delete command. The KVS library layer 304 will translate the application layer 302 data so that it can be processed in a key value data structure. The I/O stack layer 306 may translate KVS addresses into device addresses. For example, the I/O stack layer 306 may translate key value data structure addresses into device addresses (e.g., host addresses). The device driver layer 308 is an interface that allows the device (e.g., host) to communicate with the storage 320. The storage 320 may be the SSD 102 in some implementations.

As shown in FIG. 3, an application on a device (e.g., host) that includes the device architecture 300 can communicate with an SSD in multiple ways. In one implementation, the application (e.g., browser application) may communicate with the storage 320 through the application layer 302, the KVS library layer 304, the I/O stack layer 306, and the device driver layer 308. In some implementations, the application (e.g., browser application) may communicate with the storage 320 through the application layer 302 and the KVS library layer 304, bypassing one or more functionalities and/or translations of other architecture layers of the device architecture 300. For example, some or all KVS commands from the KVS library layer 304 may not need to be translated. This is possible because the storage 320 includes KVS functionality, thus, the storage 320 is able to process the KVS library layer 304, such as KVS commands.

FIG. 4 illustrates a diagram of an exemplary device architecture between a host and a solid state device (SSD) that includes KVS functionality, where several threads are running between the host and the SSD. FIG. 4 illustrates a host can be in communication with an SSD through several communication channels (e.g., channel 1, channel 2, . . . channel N), where each channel includes a thread. The first thread 400 uses the first channel 1, the second thread 410 uses the second channel 2, and the third thread 420 uses a third channel N. The threads may operate in parallel to each other. Each thread includes the application layer 302, the key value store (KVS) library layer 304, the input/output (I/O) stack layer 306, and the device driver layer 308. Each thread may include a doorbell register, a command queue (e.g., KVS commands), and a response queue.

Figure 5:
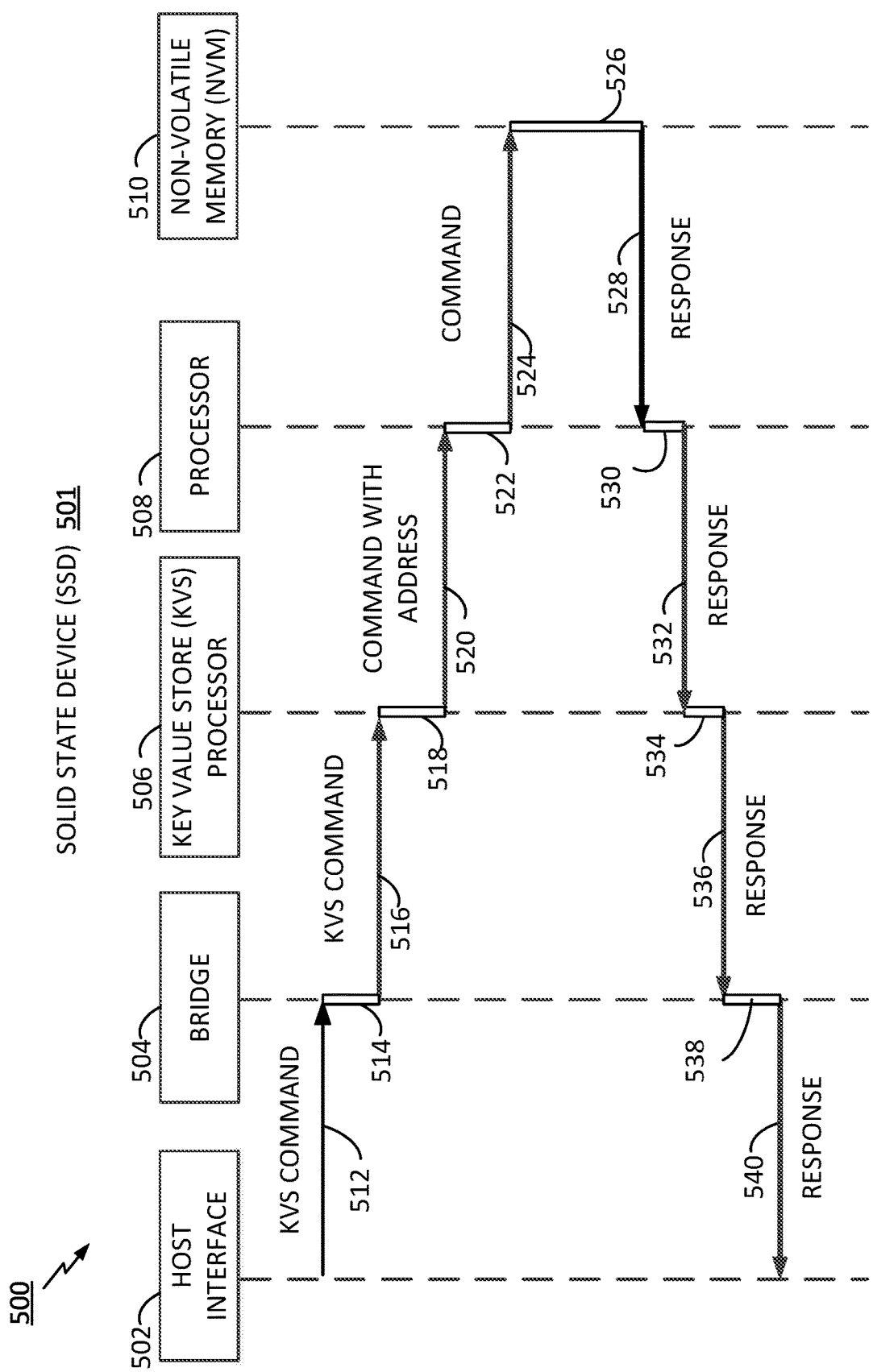
FIG. 5 illustrates a flow sequence diagram of a method for processing a key value store (KVS) command from a host, by a solid state device (SSD) in accordance with embodiments of the present disclosure.
Figure 6:
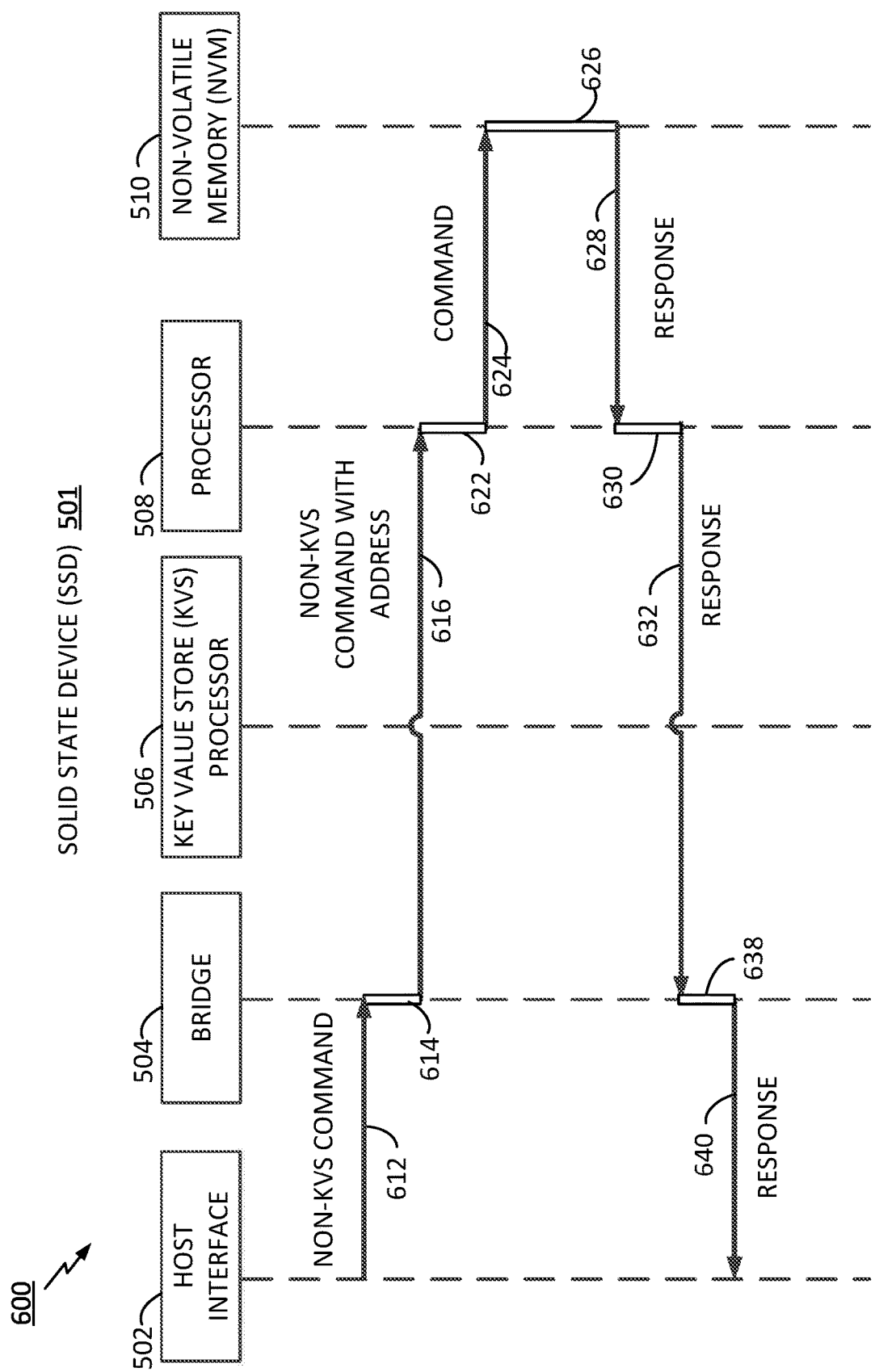
FIG. 6 illustrates a flow sequence diagram of a method for processing a non-key value store (KVS) command from a host, by a solid state device (SSD) in accordance with embodiments of the present disclosure.

Exemplary Flow Sequences of a Solid State Device (SSD) Processing Key Value Store (KVS) Command and Non-KVS Command FIGS. 5 and 6 illustrate flow sequences of a solid state device (SSD) that processes a key value store (KVS) command and a non-KVS command. The flow sequences shown in FIGS. 5 and 6 may be performed by any of the SSDs described in the present disclosure, such as the SSD 102. Also, for purpose of clarity, the flow sequences shown in FIGS. 5 and 6 do not necessary show all the components of the SSD that perform the operations described in FIGS. 5 and 6. For example, one or more of the data described (e.g., command, response) may travel through one or more buffers and/or one or more cross bars, when traveling between the different components of the SSD. In some implementations, the flow sequences shown FIGS. 5 and 6 may include other operations that are performed by the SSD.

FIG. 5 illustrates a flow sequence 500 that is performed by an SSD 501 coupled to a host (e.g., host 104). The flow sequence 500 includes processing KVS commands by the SSD 501. The SSD 501 includes a host interface 502, a bridge 504, a key value store (KVS) processor 506, a processor 508, and a non-volatile memory (NVM) 510. In one aspect, the NVM is implemented as a NAND memory.

As shown in FIG. 5, the host interface 502 sends (at 512) a key value store (KVS) command to the bridge 504. The KVS command may be received by the host interface 502 from a host (e.g., 104). Examples of KVS commands include a get command, a put command, and a delete command. In some implementations, KVS commands are commands that do not include the physical address(es) of the data that is to be processed (e.g., command free of physical address information), when the command is transmitted by the host and/or received by the SSD. The bridge 504 determines (at 514) that the command is a KVS command and sends (at 516) the KVS command to the KVS processor 506. The KVS processor 506 processes (at 518) the KVS command, which may include performing a hash computation to generate a hash value and using an index structure to identify a location (e.g., group, key value combination) in the key value data structure. In some implementations, identifying the location includes identifying a physical address of a key and value combination in the NVM 510. In some implementations, identifying the location includes identifying a physical address that is associated with a group of key and value combinations in the NVM 510.

The KVS processor 506 sends (at 520) a command that includes an address of the data, to the processor 508. The processor 508 processes (at 522) the command from the KVS processor 506. The processor 508 sends (at 524) the command to NVM 510. The NVM 510 accesses (at 526) the data based on the command. Accessing the data may include reading the data at a particular physical address of the NVM 510 and/or writing data at a particular physical address of the NVM 510.

The NVM 510 sends (at 528) the response to the command, to the processor 508, where the response is processed (at 530). The response may include data (e.g., key, value, pointer, confirmation, error). The processor 508 sends (at 532) the response to the KVS processor 506. The KVS processor 506 processes (at 534) the response and sends (at 536) the response to the bridge 504. The bridge 504 processes (at 538) processes the response and sends (at 540) the response to the host interface 502. The host interface 502 sends the response to the host (e.g., 104). The above flow sequence 500 may be performed many times sequentially or in parallel with other commands (e.g., KVS commands, non-KVS commands).

FIG. 6 illustrates a flow sequence 600 that is performed by the SSD 501 coupled to a host (e.g., host 104). The flow sequence 600 includes processing non-KVS commands by the SSD 501. The SSD 501 includes the host interface 502, the bridge 504, the key value store (KVS) processor 506, the processor 508, and the non-volatile memory (NVM) 510.

As shown in FIG. 6, the host interface 502 sends (at 612) a non-key value store (KVS) command to the bridge 504. The non-KVS command may be received by the host interface 502 from a host (e.g., 104). Non-KVS commands include commands that are not specifically limited to a key value store database. That is, non-KVS commands are commands that can be used in non-key value store databases. Examples of non-KVS commands include read commands and/or write commands. In some implementations, non-KVS commands are commands that include physical address(es) of the data that is to be processed, when the command is transmitted by the host and/or received by the SSD. The bridge 504 determines (at 614) that the command is a non-KVS command and sends (at 616) the non-KVS command to the processor 508. In some implementations, the non-KVS command may include address information (e.g., physical address of data on NVM 510). The non-KVS command bypasses the KVS processor 506. The processor 508 processes (at 622) the non-KVS command from the bridge 504. The processor 508 sends (at 524) the command to NVM 510. The NVM 510 accesses (at 626) the data based on the command. Accessing the data may include reading the data at a particular physical address of the NVM 510 and/or writing data at a particular physical address of the NVM 510.

The NVM 510 sends (at 628) the response to the command, to the processor 508, where the response is processed (at 630). The response may include various data (e.g., key, value, pointer, confirmation, error). The processor 508 sends (at 632) the response to the bridge 504. The response bypasses the KVS processor 506. The bridge 504 processes (at 638) the response and sends (at 640) the response to the host interface 502. The host interface 502 sends the response to the host (e.g., 104). The above flow sequence 600 may be performed many times sequentially or in parallel with other commands (e.g., KVS commands, non-KVS commands).

Figure 7A:
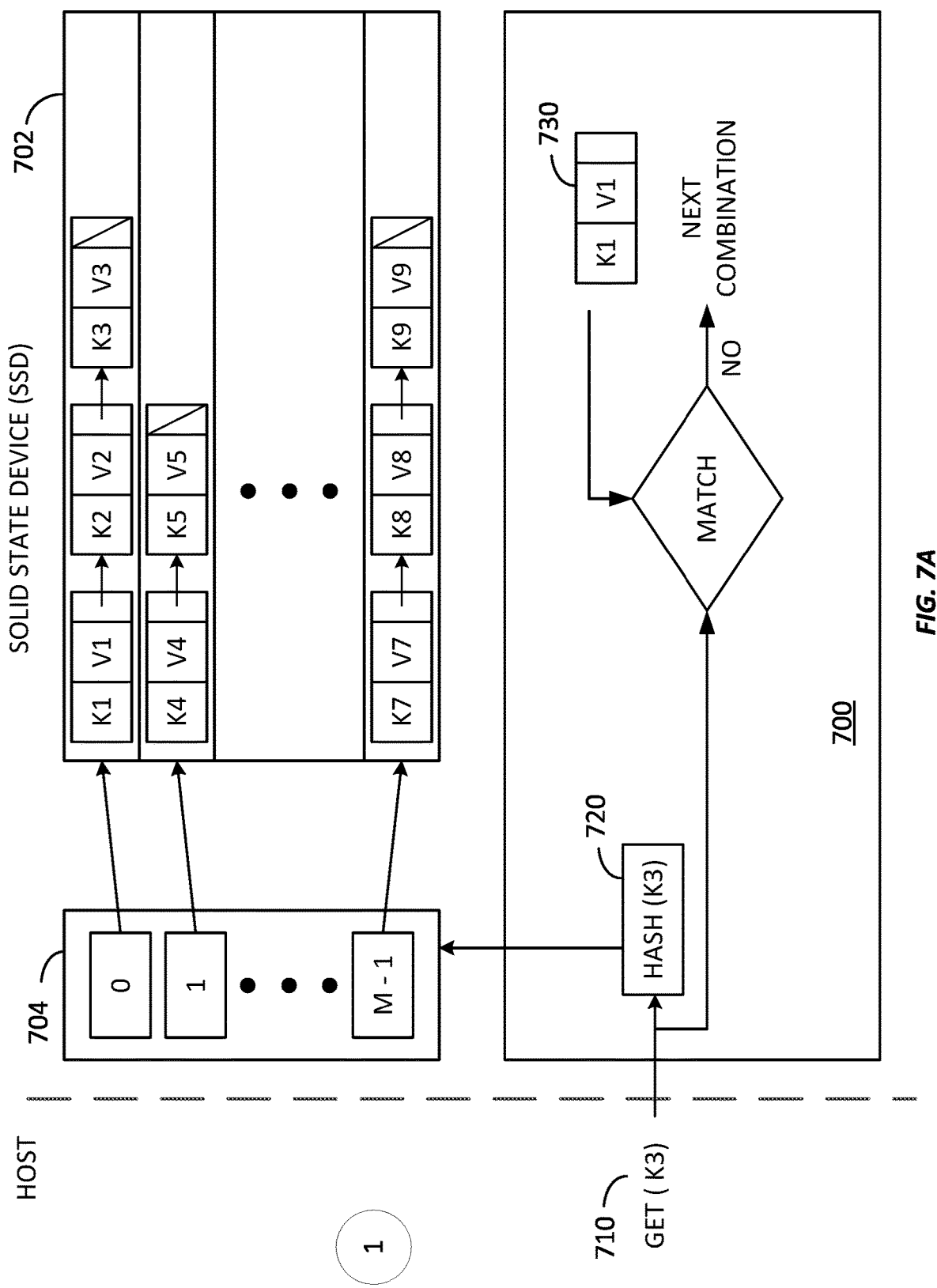
FIG. 7 (which includes FIGS. 7A-7C) illustrates a sequence diagram of a GET command from a host, by a solid state device (SSD) in accordance with embodiments of the present disclosure.
Figure 7B:
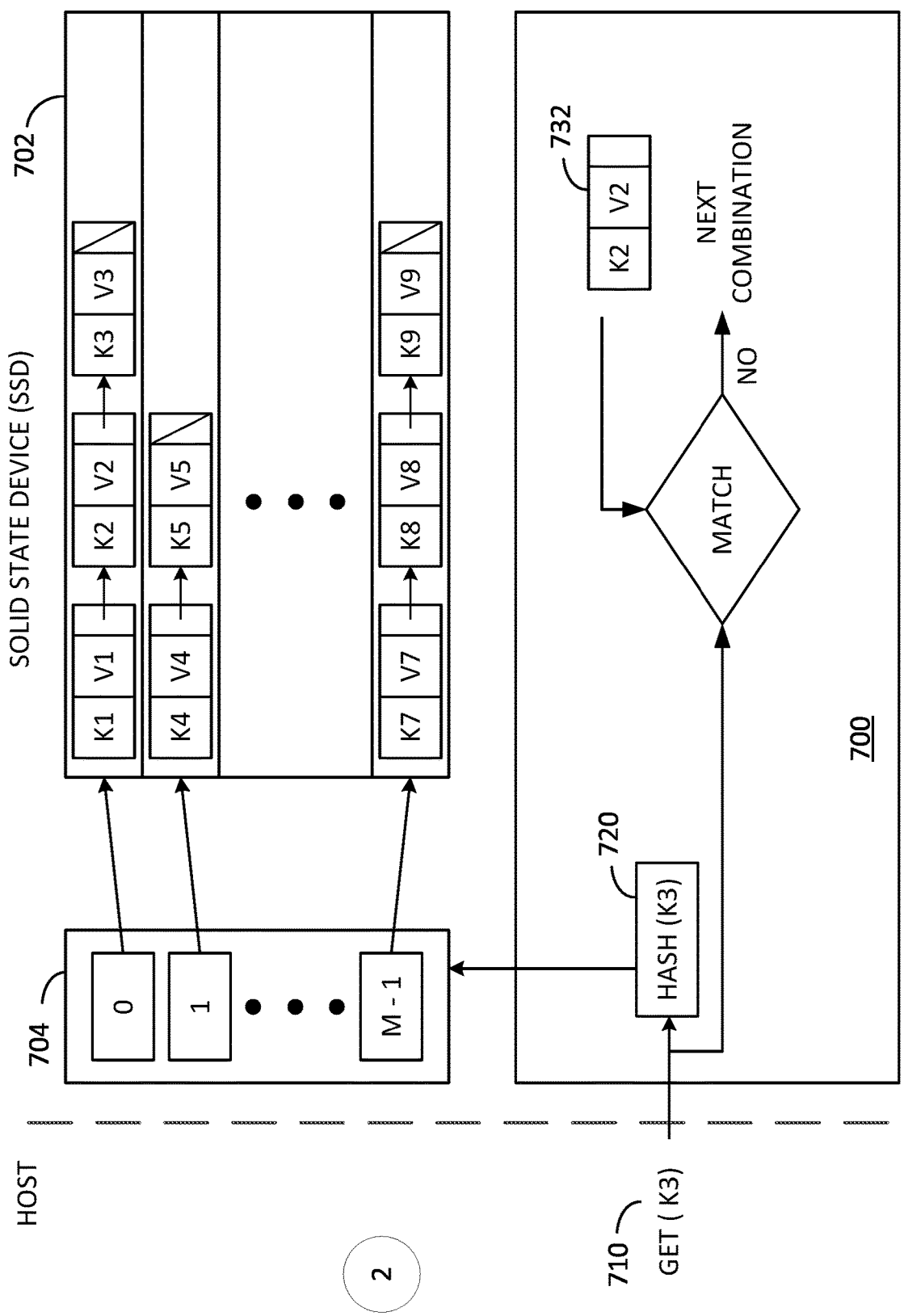
Figure 7C:
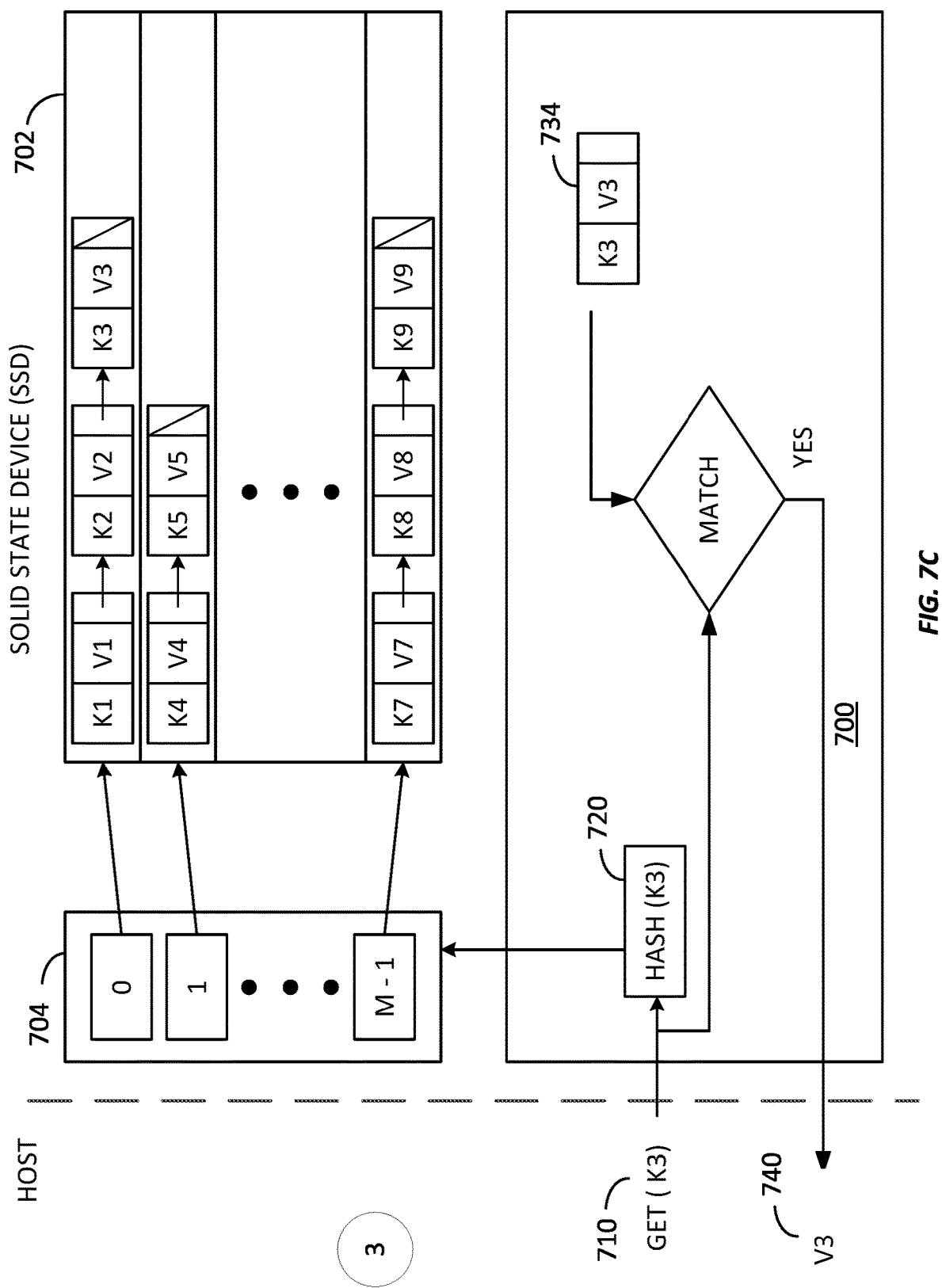

FIG. 7 (which includes FIGS. 7A-7C) illustrates a flow sequence of a solid state device (SSD) performing a key value store (KVS) command. In particular, FIG. 7 illustrates a sequence of a get command, from a host, performed by an SSD.

As shown in FIG. 7A, the SSD receives a get command 710, from a host. The get command 710 specifies the SSD to get a value associated with key (K3). The KVS processor 700 of the SSD performs a hash operation on the key (K3), which generates a hash value 720. The hash value 720 is then used on the index structure 704 to identify a group from the key value data structure 702. In this particular case, the hash value 720 points to an entry in the index structure 704 that identifies group 0. Group 0 points to the key (K1) and value (V1) combination 730 in the key value data structure 702. In some implementations, the entry of the index structure for group 0 includes a pointer that is a physical address of the key (K1) and value (V1) combination 730 in the key value data structure 702 (which is stored in the NVM of the SSD). The group of a key value data structure may be empty or include one or more key value data (e.g., key and value combination). Even though the pointer in the index structure 704 points to the key (K1) and value (V1) combination 730, the pointer may be considered a pointer for the group 0 of the key value data structure 702. Different implementations may store the index structure 704 differently. The SSD retrieves and reads the key (K1) and value (V1) combination 730 from the key value data structure 702, and then compares the key (K1) of the combination 730 with the key (K3) of the command 710. In this case, the keys do not match, and the SSD retrieves the next key and value combination. The next key and value combination is specified by a pointer that is located with the key (K1) and value (V1) combination 730. The pointer may be a physical address of the next key and value combination. In this example, the next key and value combination is the key (K2) and value (V2) combination.

FIG. 7B illustrates, the SSD retrieving the key (K2) and value (V2) combination 732, which is also part of group 0. The SSD retrieves and reads the key (K2) and value (V2) combination 732 from the key value data structure 702, and then compares the key (K2) of the combination 732 with the key (K3) of the command 710. The keys also do not match this time, and the SSD retrieves the next key and value combination. The location of the next key and value combination is stored as a pointer (e.g., physical address pointer) in the key (K2) and value (V2) combination 732. The pointer points to the key (K3) and value (V3) combination.

FIG. 7C illustrates, the SSD retrieving the key (K3) and value (V3) combination 734, which is also part of group 0 (which can mean they are part of the same bucket). The SSD retrieves and reads the key (K3) and value (V3) combination 734 from the key value data structure 702, and then compares the key (K3) of the key and value combination 734 with the key (K3) of the command 710. The keys now match, and the SSD provide a response 740 to the host, where the response includes the value (V3) from the key and value combination 734.

In this configuration, because of hash collision, there are multiple key and value combinations in the same group (e.g., same bucket). Under other processing operations, all key and value combinations are transmitted through the interconnect 106 to the host 104, creating unnecessary I/O overhead between the SSD and the host. This slows down the overall performance of the SSD. However, by only transmitting the key and value combination that matches, there is substantial reduction in the I/O overhead between the SSD and the host. While, the processors (e.g., KVS processor) of the SSD are likely to be slower than the processors of the host, the advantage that is gained by not having to transmit all the key and value combinations, outweighs any disadvantage that may arise through the use of a processor located at the SSD, especially in cases where the database is very large and there is a high occurrence of hash collision in the datasets. The above scenario also applies to other types of KVS commands.

Figure 8A:
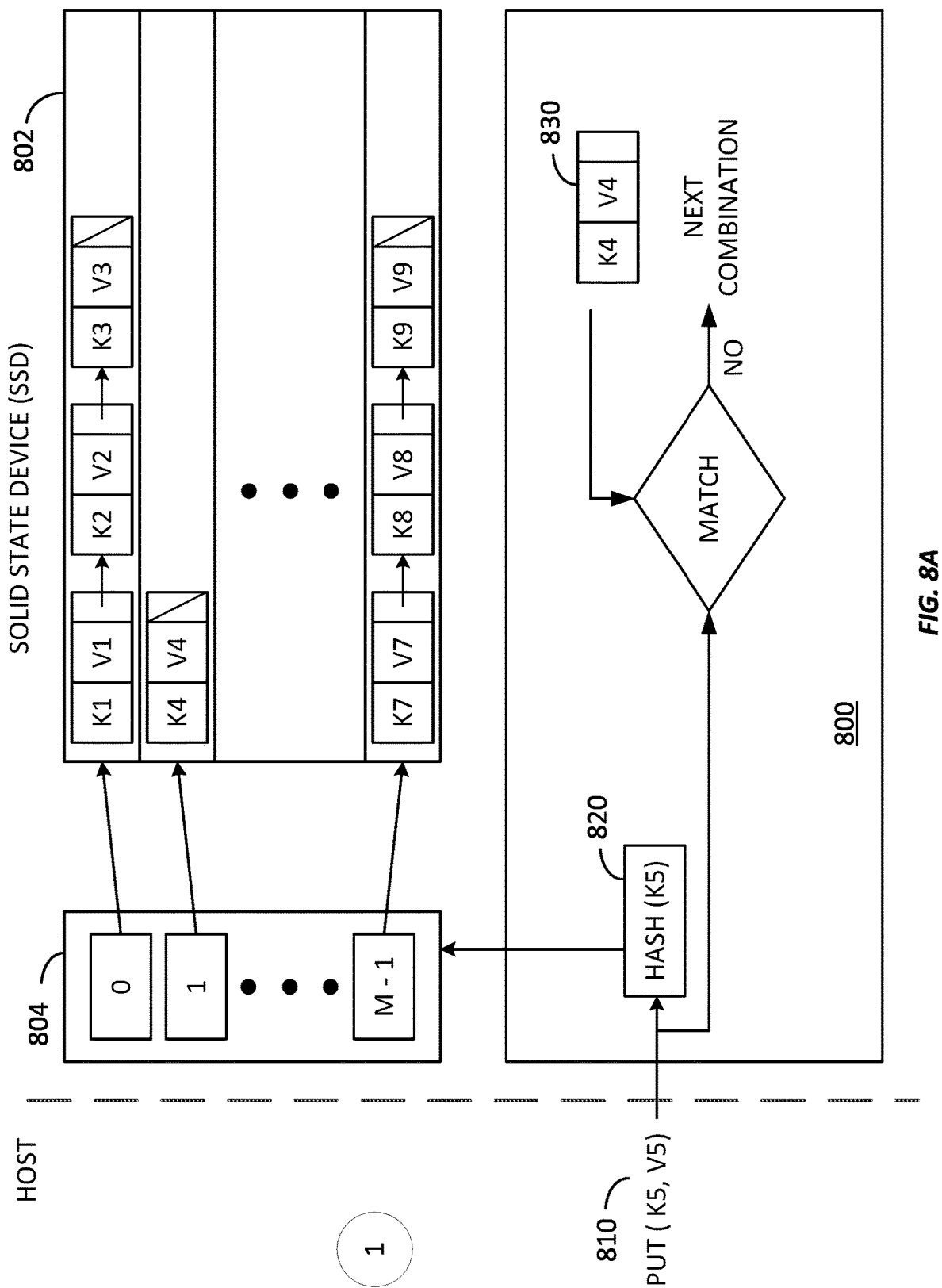
FIG. 8 (which includes FIGS. 8A-8B) illustrates a sequence diagram of a PUT command from a host, by a solid state device (SSD) in accordance with embodiments of the present disclosure.

FIG. 8 (which includes FIGS. 8A-8B) illustrates a flow sequence of a solid state device (SSD) performing a key value store (KVS) command. In particular, FIG. 8 illustrates a sequence of a put command, from a host, performed by an SSD, where the put command includes writing a new key and value combination.

As shown in FIG. 8A, the SSD receives a put command 810, from a host. The put command 810 specifies the SSD to store a new key and value combination. In particular, the put command 810 specifies storing a key (K5) and value (V5) combination 834. The KVS processor 800 of the SSD performs a hash operation on the key (K5), which generates a hash value 820. The hash value 820 is then used on the index structure 804 to identify a group from the key value data structure 802. In this particular case, the hash value 820 points to an entry in the index structure 804 that identifies group 1. Group 1 points to the key (K4) and value (V4) combination 830 in the key value data structure 802. In some implementations, the entry of the index structure for group 1 includes a pointer that is a physical address of the key (K4) and value (V4) combination 830 in the key value data structure 802. The key value data structure 802 is stored in the NVM of the SSD. The group of a key value data structure may be empty or include one or more key value data (e.g., key and value combination). Even though the pointer in the index structure 804 points to the key (K4) and value (V4) combination 830, the pointer may be considered a pointer for the group 1 of the key value data structure 802. The SSD retrieves and reads the key (K4) and value (V4) combination 830 from the key value data structure 802, and then compares the key (K4) of the combination 830 with the key (K5) of the command 810. In this case, the keys do not match, and the SSD retrieves the next key and value combination from the group. The next key and value combination is specified by a pointer that is located with the key (K4) and value (V4) combination 830. The pointer may be a physical address of the next key and value combination. However, in this example, there are no other key and value combination in the group 1. Since there are no other key and value combination in group 1, the SSD can add the key (K5) and value (V5) combination 834 after the key (K4) and value (V4) combination 830.

FIG. 8B illustrates, the SSD writing the key (K5) and value (V5) combination 834 in the key value data structure 802 of the NVM. The SSD may allocate memory block(s) (e.g., physical addresses) for the key (K5) and value (V5) combination 834 before writing the key (K5) and value (V5) combination 834. The SSD updates the pointer of the key (K4) and value (V4) combination 830 so that the pointer points to the physical address of the key (K5) and value (V5) combination 834. Once the key (K5) and (V5) combination 834 has been stored, the SSD may provide a response 840 to the host. The response 840 may include a confirmation that the key (K5) and value (V5) combination 834 has been stored in the key value data structure 802. In some implementations, instead of a pointer, the key (K5) and value (V5) combination 834 may include some indictor that it is last key and value combination in the group. In some implementations, if there is no pointer with the key and value combination, then it may be assumed that this is the last key and value combination in the group.

Figure 9A:
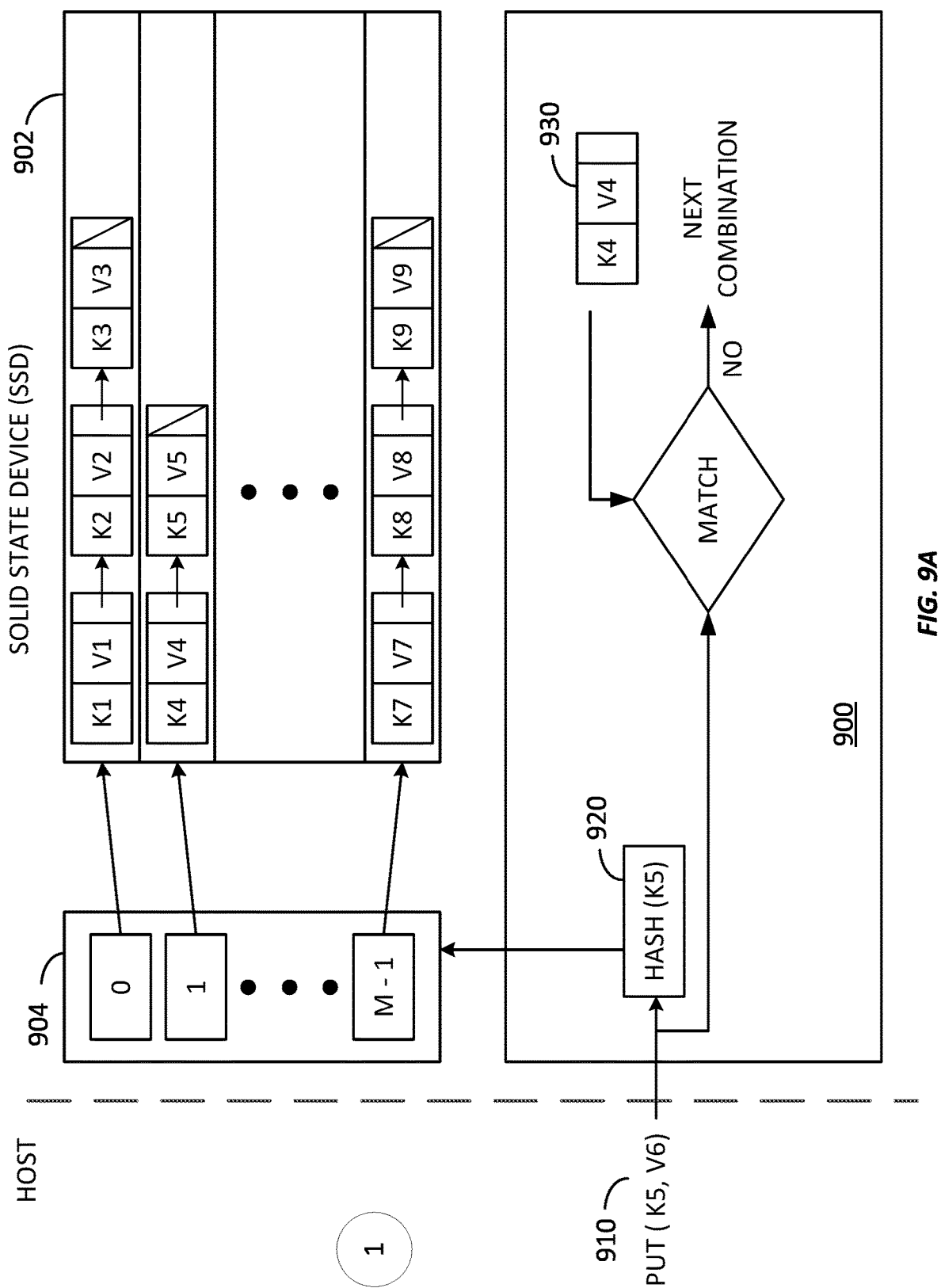
FIG. 9 (which includes FIGS. 9A-9C) illustrates a sequence diagram of another PUT command from a host, by a solid state device (SSD) in accordance with embodiments of the present disclosure.
Figure 9B:
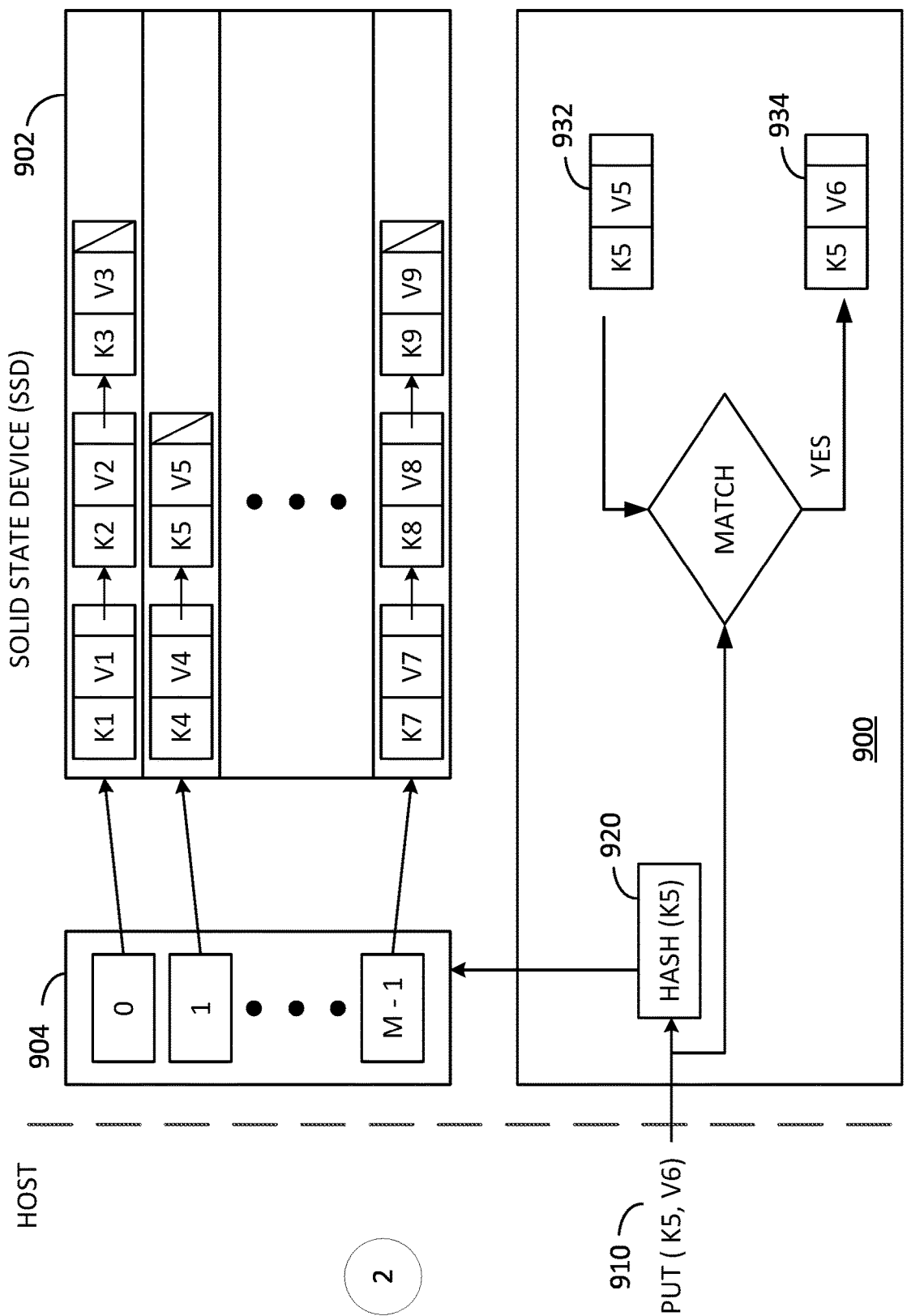
Figure 9C:
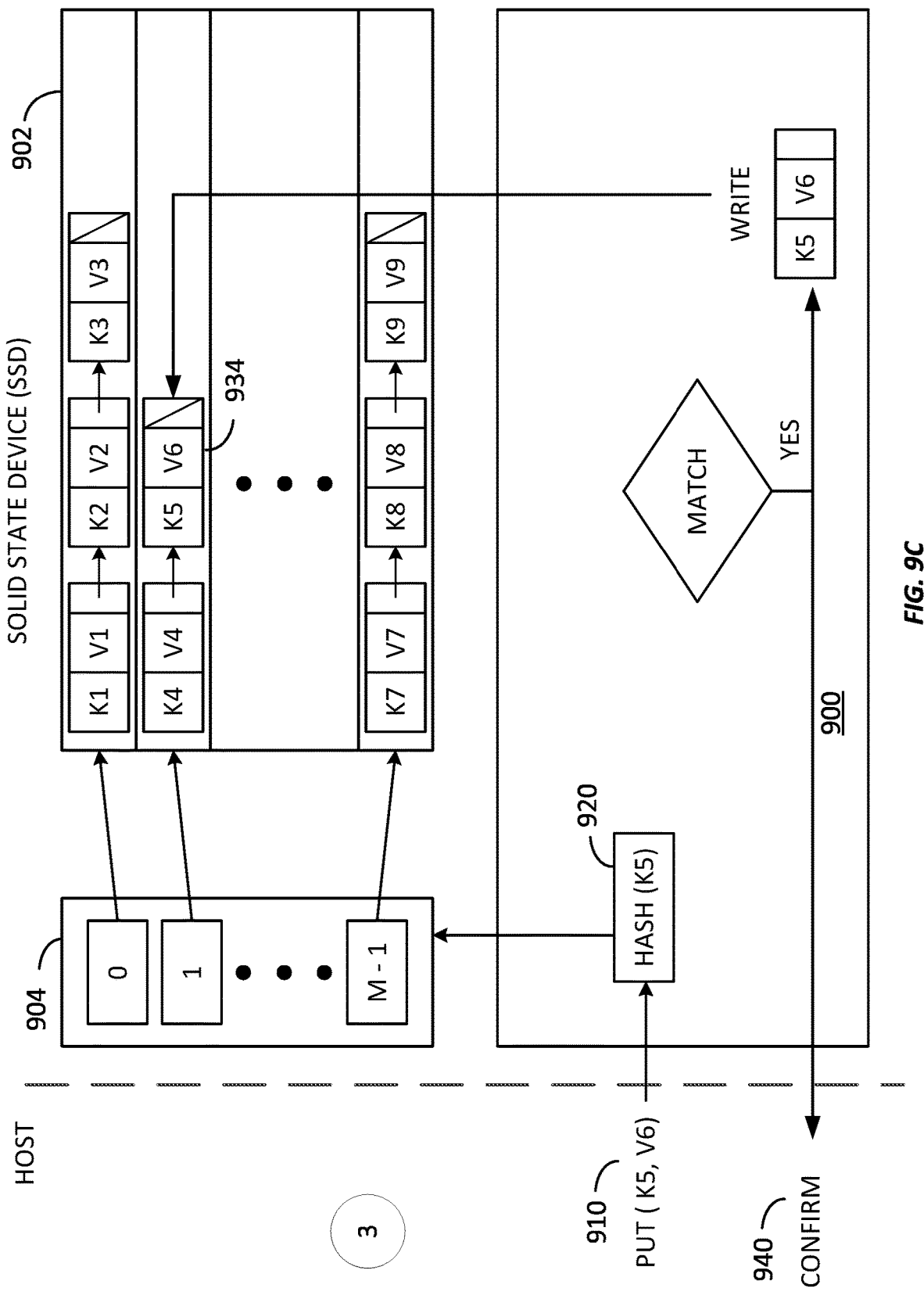

FIG. 9 (which includes FIGS. 9A-9C) illustrates a flow sequence of a solid state device (SSD) performing a key value store (KVS) command. In particular, FIG. 9 illustrates a sequence of a put command, from a host, performed by an SSD, where the put command includes updating a key and value combination.

As shown in FIG. 9A, the SSD receives a put command 910, from a host. The put command 910 specifies the SSD to store a key and value combination. In particular, the put command 910 specifies storing a key (K5) and value (V6) combination. The KVS processor 900 of the SSD performs a hash operation on the key (K5), which generates a hash value 920. The hash value 920 is then used on the index structure 904 to identify a group from the key value data structure 902. In this particular case, the hash value 920 points to an entry in the index structure 904 that identifies group 1. Group 1 points to the key (K4) and value (V4) combination 930 in the key value data structure 902. In some implementations, the entry of the index structure for group 1 includes a pointer that is a physical address of the key (K4) and value (V4) combination 930 in the key value data structure 902. The key value data structure 902 is stored in the NVM of the SSD. The group of a key value data structure may be empty or include one or more key value data (e.g., key and value combination). Even though the pointer in the index structure 904 points to the key (K4) and value (V4) combination 930, the pointer may be considered a pointer for the group 1 of the key value data structure 902. The SSD retrieves and reads the key (K4) and value (V4) combination 930 from the key value data structure 902, and then compares the key (K4) of the combination 930 with the key (K5) of the command 910. In this case, the keys do not match, and the SSD retrieves the next key and value combination in the group. The next key and value combination is specified by a pointer that is located with the key (K4) and value (V4) combination 930. The pointer may be a physical address of the next key and value combination in the group. In this example, the next key and value combination is the key (K5) and value (V5) combination.

FIG. 9B illustrates, the SSD retrieving the key (K5) and value (V5) combination 932, which is also part of group 1. The SSD retrieves and reads the key (K5) and value (V5) combination 932 from the key value data structure 902, and then compares the key (K5) of the key and value combination 932 with the key (K5) of the command 910. The keys match this time, and the SSD updates the key (K5) and value (V5) combination 932 so that V5 has been replaced with V6. The key (K5) and value (V6) combination 934 has now replaced previous key and value combination 932.

FIG. 9C illustrates, the SSD writing the (K5) and value (V6) combination 934 in the key value data structure 902 of the NVM. The key and value combination may be stored in a different physical address of the NVM or the same physical address as the previous key and value combination 932. The SSD may also need to update the pointer of the key (K4) and value (V4) combination so that the pointer points to the physical address of the key (K5) and value (V6) combination 934. Once the key (K5) and (V6) combination has been stored and/or the pointer has been updated, the SSD may provide a response 940 to the host. The response 940 may include a confirmation that the key (K5) and value (V6) combination has been stored in the key value data structure 902. If applicable, the key (K5) and value (V6) combination may have a pointer that directs to another key and value combination in the group.

Figure 10B:
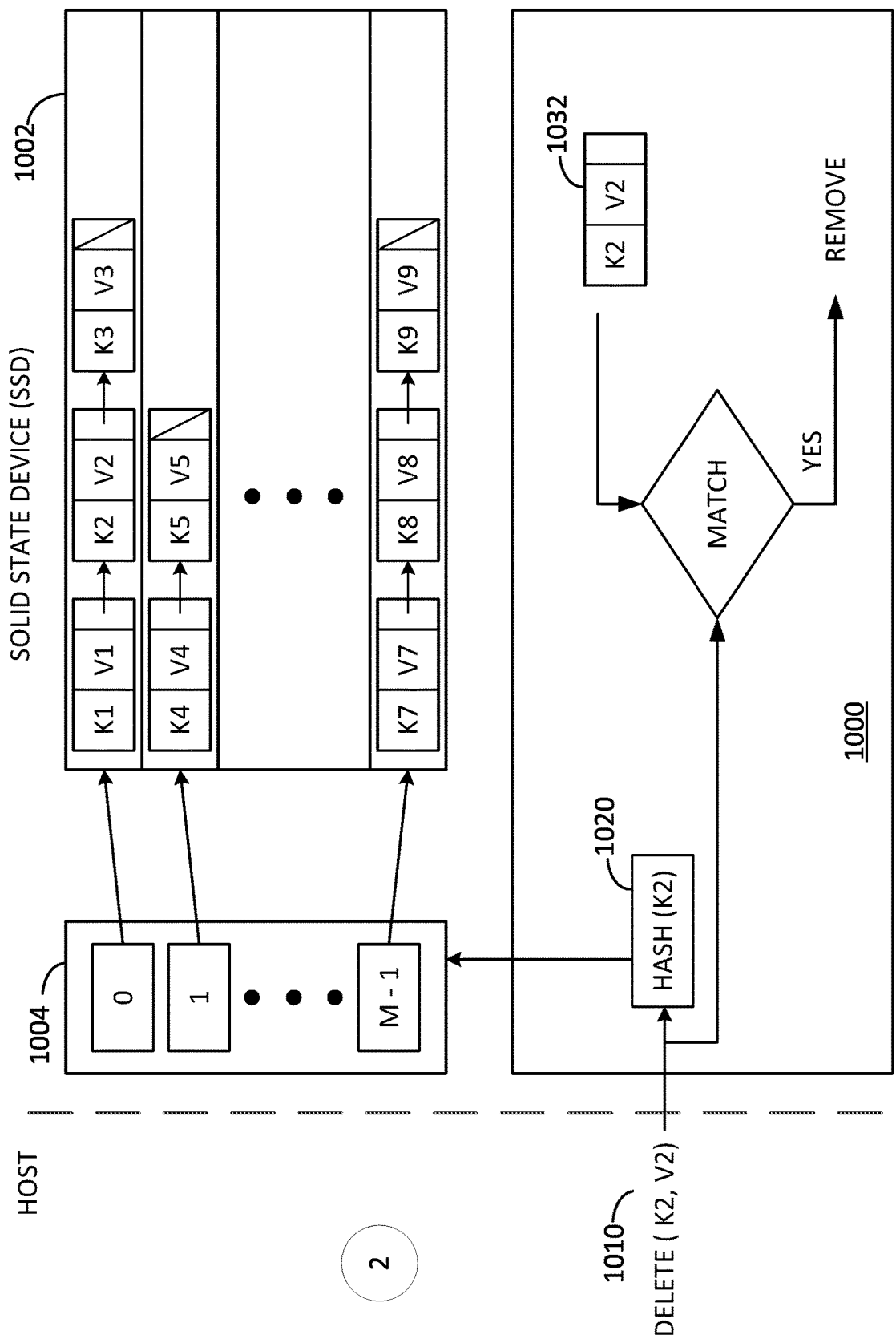
FIG. 10 (which includes FIGS. 10A-10C) illustrates a sequence diagram of a DELETE command from a host, by a solid state device (SSD) in accordance with embodiments of the present disclosure.
Figure 10C:
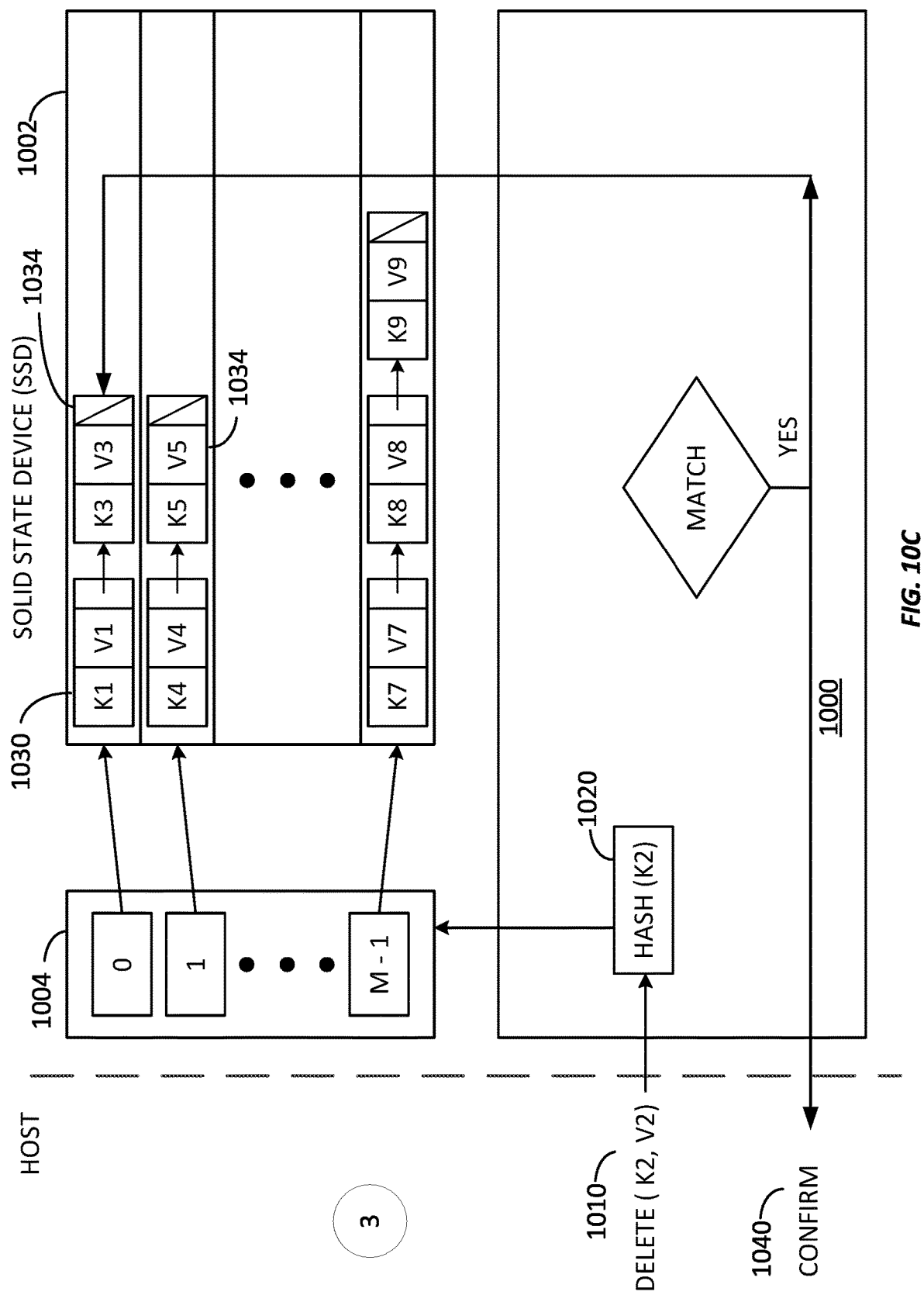

FIG. 10 (which includes FIGS. 10A-10C) illustrates a flow sequence of a solid state device (SSD) performing a key value store (KVS) command. In particular, FIG. 10 illustrates a sequence of a delete command, from a host, performed by an SSD.

As shown in FIG. 10A, the SSD receives a delete command 1010, from a host. The delete command 1010 specifies the SSD to remove a key and value combination. In particular, the delete command 1010 specifies deleting a key (K2) and value (V2) combination. The KVS processor 1000 of the SSD performs a hash operation on the key (K2), which generates a hash value 1020. The hash value 1020 is then used on the index structure 1004 to identify a group from the key value data structure 1002. In this particular case, the hash value 1020 points to an entry in the index structure 1004 that identifies group 0. Group 0 points to the key (K1) and value (V1) combination 1030 in the key value data structure 1002. In some implementations, the entry of the index structure for group 0 includes a pointer that is a physical address of the key (K1) and value (V1) combination 1030 in the key value data structure 1002. The key value data structure 1002 is stored in the NVM of the SSD. The group of a key value data structure may be empty or include one or more key value data (e.g., key and value combination). Even though the pointer in the index structure 1004 points to the key (K1) and value (V1) combination 1030, the pointer may be considered a pointer for the group 0 of the key value data structure 1002. The SSD retrieves and reads the key (K1) and value (V1) combination 1030 from the key value data structure 1002, and then compares the key (K1) of the key and value combination 1030 with the key (K5) of the command 1010. In this case, the keys do not match, and the SSD retrieves the next key and value combination from the group. The next key and value combination is specified by a pointer that is located with the key (K1) and value (V1) combination 1030. The pointer may be a physical address of the next key and value combination. In this example, the next key and value combination from the group is the key (K2) and value (V2) combination.

FIG. 10B illustrates, the SSD retrieving the key (K2) and value (V2) combination 1032, which is also part of group 0. The SSD retrieves and reads the key (K2) and value (V2) combination 1032 from the key value data structure 1002, and then compares the key (K2) of the key and value combination 1032 with the key (K2) of the command 1010. The keys match this time.

The SSD can do one of several things. In one implementation, the SSD may update the pointer of the key (K1) and value (V1) combination 1030 to point to the physical address of the key (K3) and value (V3) combination 1034, instead of pointing to the key (K2) and value (V2) 1032 combination. This effectively removes the key (K2) and value (V2) combination 1032 from the key value data structure 1002, without actually deleting it from the physical address of the NVM. In some implementations, the SSD may deallocate the memory block(s) (e.g., physical address) that stores the key (K2) a value (V2) combination 1032, which means that the particular memory block(s) is no longer being used by the key value data structure 1002, and is available for storing new data.

FIG. 10C illustrates the SSD updating the pointer of the key and value combination 1030 so that it points to the key and value combination 1034, instead of the key and value combination 1032. After updating the pointer, the SSD may provide a response 1040 to the host. The response 1040 may include a confirmation that the key (K2) and value (V2) combination 1032 has been deleted in the key value data structure 1002. In another implementation, the SSD may write over the physical address of the key and value combination 1032 to delete the key and value combination 1032 from the key value data structure 1002. In such an instance, the SSD would still update the pointer of the key and value combination 1030 to point to the key and value combination 1034.

Exemplary Flow Charts of Methods of Processing Key Value Store (KVS) Command and Non-KVS Command, by a Solid State Device (SSD)

Figure 11:
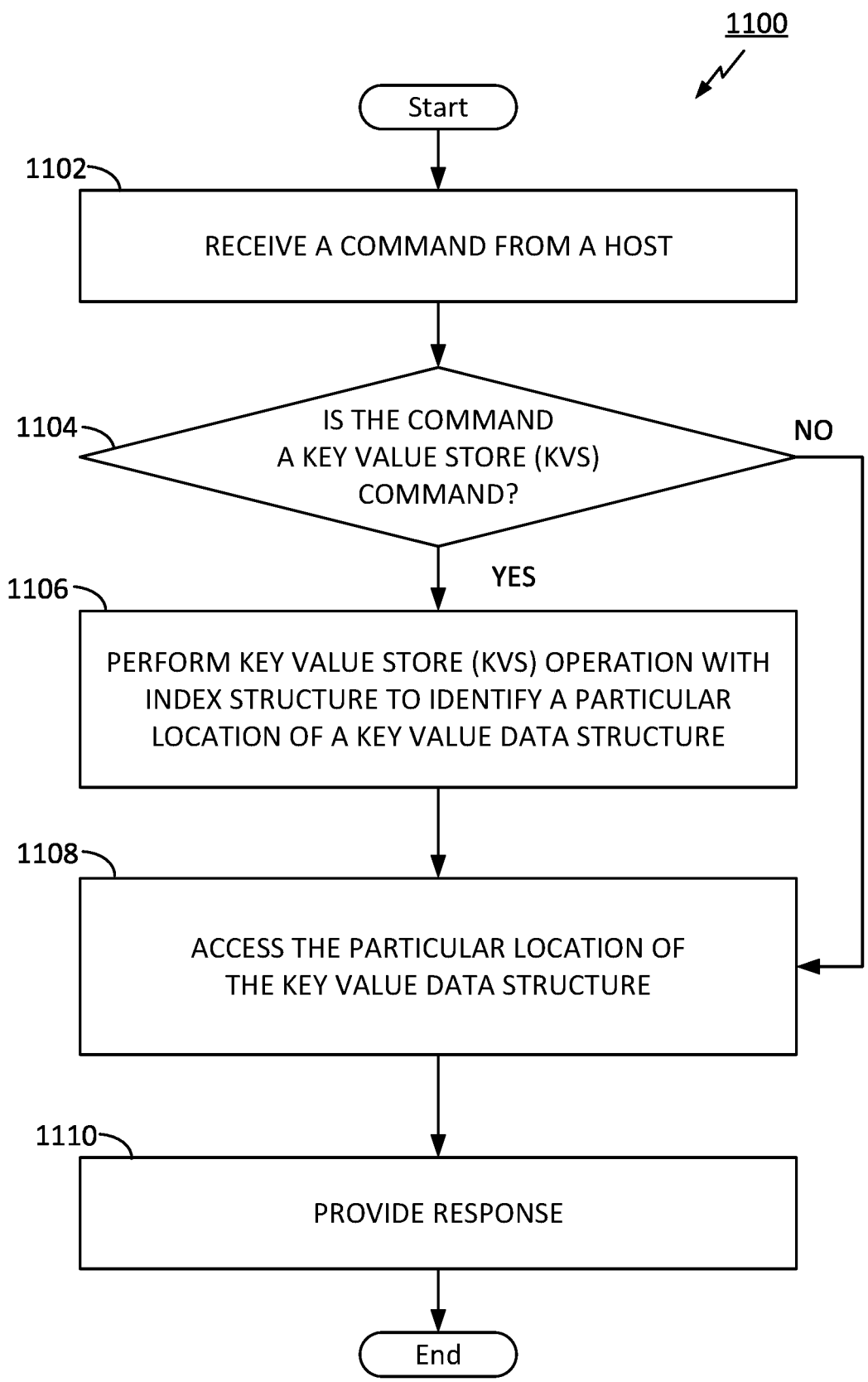
FIG. 11 illustrates an exemplary flowchart of a method for processing various commands from a host, by a solid state device (SSD) in accordance with embodiments of the present disclosure.
Figure 12:
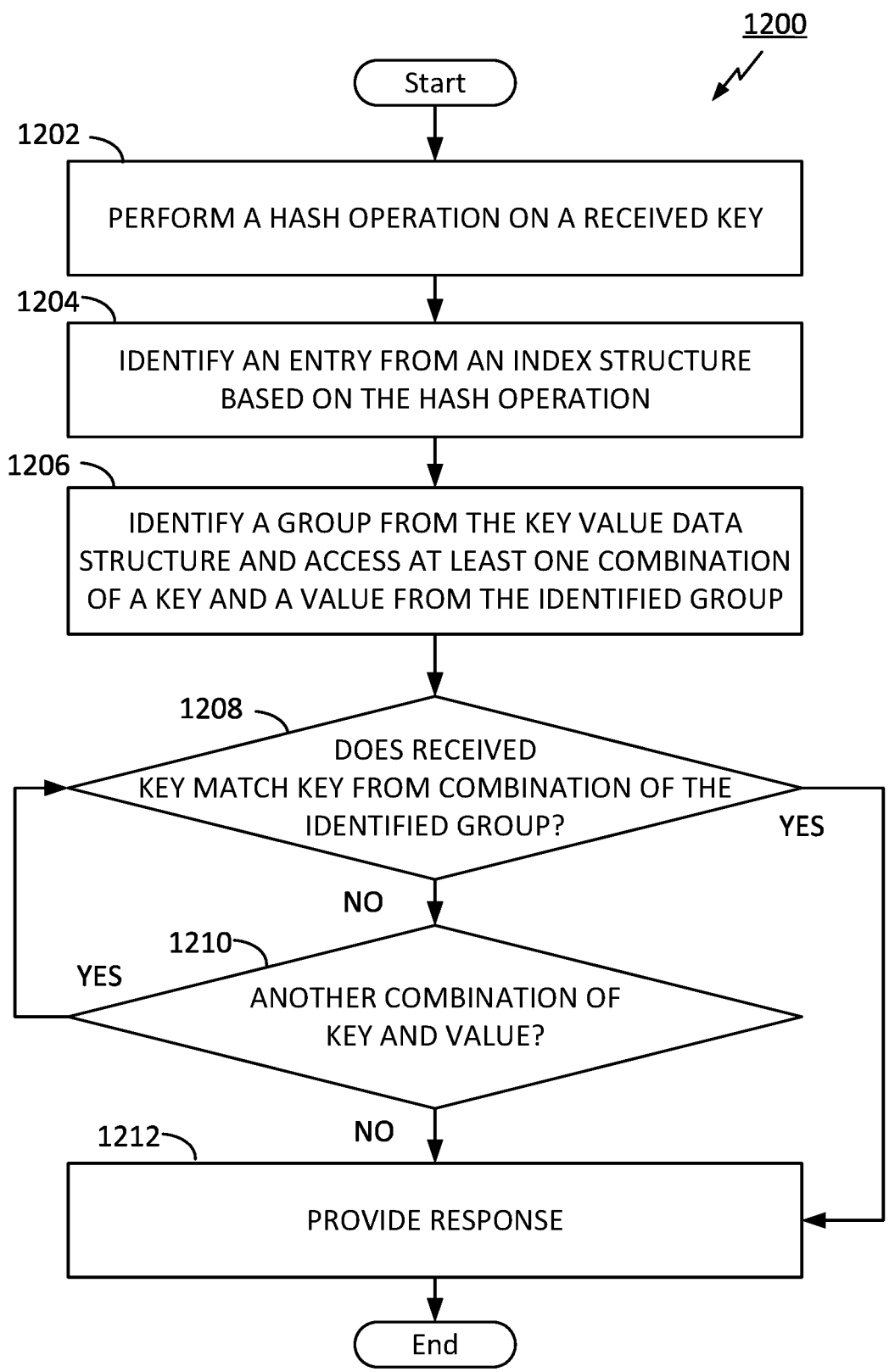
FIG. 12 illustrates an exemplary flowchart for processing a key value store (KVS) command from a host, by a solid state device (SSD) in accordance with embodiments of the present disclosure.

FIGS. 11 and 12 illustrate flow charts of methods for processing a key value store (KVS) command and a non-KVS command by a solid state device (SSD). The methods shown in FIGS. 11 and 12 may be performed by any of the SSDs described in the present disclosure, such as the SSD 102. Also, for purpose of clarity, the methods shown in FIGS. 11 and 12 do not necessarily show all the operations performed by the SSD. In some implementations, the methods shown in FIGS. 11 and 12 may include other operations that can be performed by the SSD. In some implementations, the order of the methods may be changed.

FIG. 11 illustrates a flow chart of a method 1100 for processing one or more commands received from a host. The method 1100 may be performed by an SSD (e.g., 104, 501). The method receives (at 1102) a command from a host. The command may be received by a host interface (e.g., 110). The method determines (at 1104) whether the command is a key value store (KVS) command. The determination may be made by the bridge 112 and/or the host interface 110. The method 1100 may determine whether the command is a KVS command by looking at whether or not the command includes commands that can only be used by a key value (KV) database. In some implementations, the method may determine whether the command is a KVS command by looking at whether or not the command specifically includes a get command, a put command, or a delete command. In some implementations, when the command includes a get command, a put command, or a delete command, the method determines that the command is a KVS command.

When the method determines (at 1104) that the command is not a KVS command, the method proceeds to access (at 1108) a particular location of a key value data structure in the non-volatile memory (NVM). Examples of non-KVS commands may include a read command and/or a write command. The access (at 1108) of the key value data structure may be performed by NVM processor. The accessing (at 1108) of the key value data structure may include reading a physical address of the NVM and/or writing at a physical address of the NVM.

When the method determines (at 1104) that the command is a KVS command, the method proceeds to perform (at 1106) a key value store (KVS) operation with an index structure to identify a particular location of a key value data structure in the non-volatile memory (NVM). The performing (at 1106) of the KVS operations may include performing one or more hashing computations and/or hashing operations to identify one or more hash values, which may correspond to entries of an index structure. An example of performing a KVS operation is described in FIG. 12. Once the KVS operation has been performed (at 1106), the method accesses (at 1108) the key value data structure at the NVM based on the KVS operation, the index structure and the key value data structure. The method provides (at 1110) a response to a host based on the accessed data. The method 1100 of FIG. 11 may be performed iteratively for several commands (e.g., KVS commands and/or non-KVS commands).

FIG. 12 illustrates a flow chart of a method 1200 for processing one or more KVS commands received from a host. Examples of the method 1200 of FIG. 12 are illustrated in FIGS. 7-10. The received command is a KVS command that includes a key. The method 1200 may be performed by an SSD (e.g., 104, 501). The method may start after a command that includes a key, is received from a host. The method may start after the method determines that the command that is received, is a KVS command. The command may be received by a host interface (e.g., 110). The method performs (at 1202) a hash computation or hash operation on a key in the command received by SSD. The hash operation computes a hash value based on the key that accompanies the command (e.g., KVS command). The hash operation may map a key of an arbitrary size to data (e.g., hash value) of fixed size. The hash operation may include a hash function (e.g., Jenkins hash function). The hash function may be used to map a key to a key value data structure, where the key can be used with an index structure to point to a group (e.g., bucket) in the key value data structure that stores one or more the key and value combinations. The number of possible keys is typically larger than the number of entries (e.g., hash values) in the index structure. Each entry (e.g., hash value) of the index structure will point to a specific location or group (e.g., bucket) of key value data (e.g., key and value combination) in the key value data structure. For example, each entry may be pointer that provides a physical address of a key and value combination in the particular group of key value data. That physical address may represent the location of the particular group, even if not all key and value combinations are stored at that physical address. A hash function may generate the same hash value for different keys. Thus, a specific location or group (e.g., bucket) of key value data in the key value data structure may store more than one combination of a key and a value. It is noted that although the different key and value combinations may be part of the same location or same group of key value data from the key value data structure, they may be stored in different physical addresses of the storage device. A group of key value data may be empty or include one or more key and value combinations.

The method identifies (at 1204) an entry or group from the index structure based on the hash operation. Each entry or group is associated with a hash value. The identified entry or group may point to a group of key value data that includes one or more of key and value combinations. In some implementations, the group of key value data may be empty. The method identifies (at 1206) a group key value data based on the identified entry of the index structure, and accesses (at 1206) at least one key and value combination from the identified group of key value data from the key value data structure. Once the group of key value data has been identified, the method may process the identified group of key value data, which may include accessing, retrieving, comparing, and/or storing key value data. Accessing the at least one key and value combination may include reading and/or writing data at a particular location (e.g., physical address) of the NVM. The method determines (at 1208) whether the key associated with the received command matches the key from the accessed key and value combination from the identified group.

If the keys match, then the method proceeds to provide (at 1212) a response that includes a value from the accessed key and value combination. In some implementations, providing a response may include writing the key and value combination at a particular location of the key value data structure. However, if the keys do not match, the method determines (at 1210) whether there is another key and value combination for the identified group of key value data. If the method determines (at 1210) that there is no other key and value combination for the group, the method provides (at 1212) a response that includes an error message and/or a mismatch message.

If the method determines (at 1210), there is another key and value combination for the identified group of key value data, the method proceeds to determines (at 1208) whether the key associated with the received command matches another key from the other accessed key and value combination from the identified group of key value data. The method 1200 of FIG. 12 may be performed iteratively for several commands.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A solid state device (SSD) comprising:
   a non-volatile memory (NVM) configured to store a key value data structure;
   a key value store (KVS) processor configured to:
      receive a key value store (KVS) command from a host;
      perform a key value store (KVS) operation on the key value data structure based on the received KVS command; and
      provide a response to the host based on the KVS operation; and a processor configured to (i) process a non-KVS command from the host, on the NVM, and (ii) perform a non-KVS operation on the NVM based on the non-KVS command.

2. The SSD of claim 1, wherein the KVS command is selected from the group consisting of a get command, a put command, and a delete command.

3. The SSD of claim 1, wherein performing the key value store (KVS) operation comprises using an index structure to process the key value data structure based on the received KVS command.

4. The SSD of claim 1, further comprising:
a bridge configured to:
receive a command from the host;
send the command to the KVS processor when the command is the KVS command; and
send the command to the processor when the command is a non-KVS command,
wherein a non-KVS command includes (i) a command configured for use in a non-key value data structure, and/or (ii) a command comprising a physical address of data that is to be processed at the NVM.

5. The SSD of claim 1, wherein performing the KVS operation comprises performing a get command, the performing the get command comprising:
generating a hash value based on the KVS command, wherein the KVS command comprises a request for a particular value associated with a particular key;
identifying, using the hash value and an index structure, a particular location in the key value data structure; and
retrieving at least one stored key and stored value combination, from the particular location in the key value data structure.

6. The SSD of claim 5, wherein providing the response to the host comprises providing the stored value associated with the stored key.

7. The SSD of claim 5, wherein the particular location in the key value data structure stores a plurality of stored key and stored value combinations, the particular location comprising a plurality of physical addresses.

8. The SSD of claim 7, wherein performing the KVS operation further comprises iteratively comparing each stored key and stored value combination, at the particular location of the key value data structure, until a particular stored key matches the particular key from the KVS command.

9. The SSD of claim 1, further comprising a command scheduler configured to schedule a plurality of received KVS commands in a particular order to be processed by the KVS processor.

10. The SSD of claim 1, further comprising a hash controller configured to perform one or more hash operations on keys of the received KVS commands.

11. A method for operating a solid state device (SSD), comprising:
storing, at a non-volatile memory (NVM) of the SSD, a key value data structure;
receiving a command from a host;
determining whether the command is a key-value store (KVS) command,
wherein when the command is determined to be a non-KVS command, sending the command to a processor of the SSD, and
wherein when the command is determined to be a KVS command;
sending the command to a KVS processor of the SSD;
identifying, at the SSD, an entry of an index structure based on the received KVS command;
identifying a group of key value data from the key value data structure based on the identified entry;
processing, at the SSD, one or more key value data from the identified group of key value data based on the received KVS command; and
providing a response to the host, based on the processing of the one or more key value data.

12. The method of claim 11, wherein identifying the entry of the index structure comprises generating, at the SSD, a hash value based on the received KVS command.

13. The method of claim 11, wherein receiving the command comprises receiving, at a bridge of the SSD, a command from the host.

14. The method of claim 11,
wherein when the command is determined to be a KVS command, further comprising generating a hash value based on the KVS command,
wherein the KVS command comprises a request for a particular value associated with a particular key,
wherein identifying the group of key value data comprises identifying a particular location in the key value data structure; and
wherein processing the one or more key value data comprises retrieving at least one stored key and stored value combination, at the particular location in the key value data structure.

15. The method of claim 14, wherein providing the response to the host, comprises providing the stored value associated with the stored key.

16. The method of claim 14, wherein processing one or more key value data comprises iteratively comparing each stored key and stored value combination, at a plurality of locations of the key value data structure, until a particular stored key matches the particular key from the KVS command.

17. The method of claim 11,
wherein when the command is determined to be a KVS command, further comprising generating a hash value based on the KVS command,
wherein the KVS command comprises a request for storing a particular value with a particular key;
wherein identifying the group of key value data comprises identifying a particular location in the key value data structure; and
wherein processing the one or more key value data comprises storing the particular key and the particular value combination, at the particular location in the key value data structure.

18. The method of claim 11,
wherein when the command is determined to be a KVS command, further comprising generating a hash value based on the KVS command,
wherein the KVS command comprises a request for deleting a particular value with a particular key;
wherein identifying the group of key value data comprises identifying a particular location in the key value data structure; and
wherein processing the one or more key value data comprises deleting a pointer to the particular location storing the particular key and the particular value combination.

19. An apparatus for operating a solid state device (SSD), comprising:
means for non-volatile storing of a key value data structure;

means for key value store (KVS) processing comprising:
   means for receiving a key value store (KVS) command from a host;
   means for performing a key value store (KVS) operation on the key value data structure based on the received KVS command, wherein the means for performing the key value store (KVS) operation comprises generating a hash value based on the received KVS command; and
   means for providing a response to the host based on the KVS operation; and
means for non-KVS processing comprising:
   means for receiving a non-KVS command from the host;
   means for performing a non-KVS operation on the means for non-volatile storing based on the non-KVS command; and
   means for providing a response to the host based on the non-KVS operation.

20. The apparatus of claim 19, wherein the means for performing the key value store (KVS) operation comprises using an index structure to process the key value data structure based on the received KVS command.

21. The SSD of claim 1, further comprising a buffer configured to manage flow of KVS commands to the KVS processor, wherein at least one KVS command that is received from the host travels through the buffer.

22. The SSD of claim 1, wherein the KVS processor is configured to receive a KVS command that bypasses an input/output (I/O) stack layer and/or a device driver layer.

* * * * *